US010837410B2

(12) United States Patent
Kato

(10) Patent No.: US 10,837,410 B2
(45) Date of Patent: Nov. 17, 2020

(54) EVAPORATED FUEL TREATMENT DEVICE

(71) Applicant: AISAN KOGYO KABUSHIKI KAISHA, Obu (JP)

(72) Inventor: Nobuhiro Kato, Toykai (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 16/329,920

(22) PCT Filed: Jun. 21, 2017

(86) PCT No.: PCT/JP2017/022920
§ 371 (c)(1),
(2) Date: Mar. 1, 2019

(87) PCT Pub. No.: WO2018/047435
PCT Pub. Date: Mar. 15, 2018

(65) Prior Publication Data

US 2019/0242331 A1    Aug. 8, 2019

(30) Foreign Application Priority Data

Sep. 6, 2016  (JP) ................. 2016-174014

(51) Int. Cl.
*F02M 25/08* (2006.01)
*B60K 15/035* (2006.01)

(52) U.S. Cl.
CPC ... *F02M 25/0809* (2013.01); *B60K 15/03504* (2013.01); *F02M 25/08* (2013.01);
(Continued)

(58) Field of Classification Search
CPC ............... F02M 25/0809; F02M 25/08; F02M 25/0836; F02M 25/089; B60K 15/03504; B60K 2015/03514
See application file for complete search history.

(56) References Cited

U.S. PATENT DOCUMENTS 6,695,895 B2    2/2004  Hyodo et al.
7,077,112 B2 *  7/2006  Mitani ................. F02M 25/08
                                                 123/518
(Continued)

FOREIGN PATENT DOCUMENTS

JP    H10-104114 A    4/1998
JP    2003-042014 A   2/2003
(Continued)

OTHER PUBLICATIONS

International Preliminary Examination Report (IPER) for PCT/JP2017/022920 dated Aug. 3, 2018 (29 pages including Japanese version and English translation).
(Continued)

*Primary Examiner* — Joseph J Dallo
(74) *Attorney, Agent, or Firm* — Shumaker, Loop & Kendrick, LLP

(57) ABSTRACT

An evaporated fuel processing device may include: a canister that communicates with a fuel tank though a tank passage, communicates with an intake passage of an engine through a purge passage, and communicates with open air through an open air passage; a control valve that switches between a closed state of closing the purge passage and an open state of opening the same; a pump that changes a pressure in a communicating space in a case where the control valve is in the closed state, the communicating space defined by the fuel tank, the tank passage, the canister, the open air passage, and the purge passage on a side closer to the canister relative to the control valve; a pressure detector disposed in the communicating space; and a determining unit that determines the evaporated fuel processing device is not operating normally by using a pressure detection result by the pressure detector in a state where the control valve is (Continued)

in the closed state and the pressure in the communicating space is changed by the pump.

3 Claims, 25 Drawing Sheets

(52) U.S. Cl.
CPC ...... *F02M 25/089* (2013.01); *F02M 25/0836* (2013.01); *B60K 2015/03514* (2013.01)

(56) References Cited

U.S. PATENT DOCUMENTS

| | | | |
|---|---|---|---|
| 7,347,194 | B2 | 3/2008 | Sato |
| 7,347,197 | B2 | 3/2008 | Sato |
| 7,383,826 | B2 | 6/2008 | Kano et al. |
| 7,472,582 | B2 | 1/2009 | Ito et al. |
| 8,689,613 | B2* | 4/2014 | Perry ................ F02M 25/0809 123/519 |
| 9,689,349 | B2 | 6/2017 | Matsunaga et al. |
| 9,702,782 | B2 | 7/2017 | Criel et al. |
| 2002/0124836 | A1* | 9/2002 | Reddy .................... F02M 25/08 123/518 |
| 2003/0110836 | A1* | 6/2003 | Cho ................... F02M 25/0818 73/40.7 |
| 2005/0016505 | A1* | 1/2005 | Everingham ...... F02M 25/0836 123/520 |
| 2006/0185653 | A1* | 8/2006 | Everingham ...... F02M 25/0836 123/520 |
| 2009/0308359 | A1* | 12/2009 | Wang ................ F02M 25/0836 123/520 |
| 2012/0152210 | A1* | 6/2012 | Reddy ................ F02M 25/0836 123/520 |
| 2014/0257721 | A1* | 9/2014 | Thompson ............ G01M 3/226 702/51 |
| 2014/0311461 | A1* | 10/2014 | Dudar ................ F02M 25/0818 123/520 |
| 2014/0324284 | A1* | 10/2014 | Glinsky .................... G07C 3/08 701/34.4 |
| 2015/0120165 | A1* | 4/2015 | Glinsky ................. G07C 5/006 701/101 |
| 2016/0017849 | A1 | 1/2016 | Shirai |
| 2017/0342946 | A1* | 11/2017 | Sager ................. F02M 25/0827 |

FOREIGN PATENT DOCUMENTS

| | | |
|---|---|---|
| JP | 2003-343362 A | 12/2003 |
| JP | 2005-351107 A | 12/2005 |
| JP | 2006-316702 A | 11/2006 |
| JP | 2007-187011 A | 7/2007 |
| JP | 2007-218122 A | 8/2007 |
| JP | 2012-112305 A | 6/2012 |
| JP | 2015-096710 A | 5/2015 |
| JP | 2015-516065 A | 6/2015 |
| JP | 2015-190347 A | 11/2015 |
| JP | 2015-190348 A | 11/2015 |
| JP | 2016-020675 A | 2/2016 |

OTHER PUBLICATIONS

JP Office Action for JP Pat. App. No. 2016-174014 dated Mar. 10, 2020 (8 pages total including English translation).
International Search Report (ISR) for PCT/JP2017/022920 dated Sep. 12, 2017 (4 pages total including English translation).

* cited by examiner (First Embodiment)

|  | First State | Second State |
|---|---|---|
| Pump | Stopped | Driven |
| Control Valve | Closed | Closed |
| Pressure Sensors | Atmospheric Pressure | Positive Pressure |

(Second Embodiment)

|  | First State | Second State |
|---|---|---|
| Pump | Stopped | Driven |
| Control Valve | Closed | Closed |
| Pressure Sensors | Atmospheric Pressure | Negative Pressure |

(Third Embodiment)

|  | First State | Second State |
|---|---|---|
| Pump | Driven | Stopped |
| Control Valve | Opened | Closed |
| Open Air Valve | Closed | Closed |
| First Pressure Sensor | Atmospheric Pressure | Negative Pressure Small |
| Second, Third Pressure Sensors | Negative Pressure Large | Negative Pressure Small |

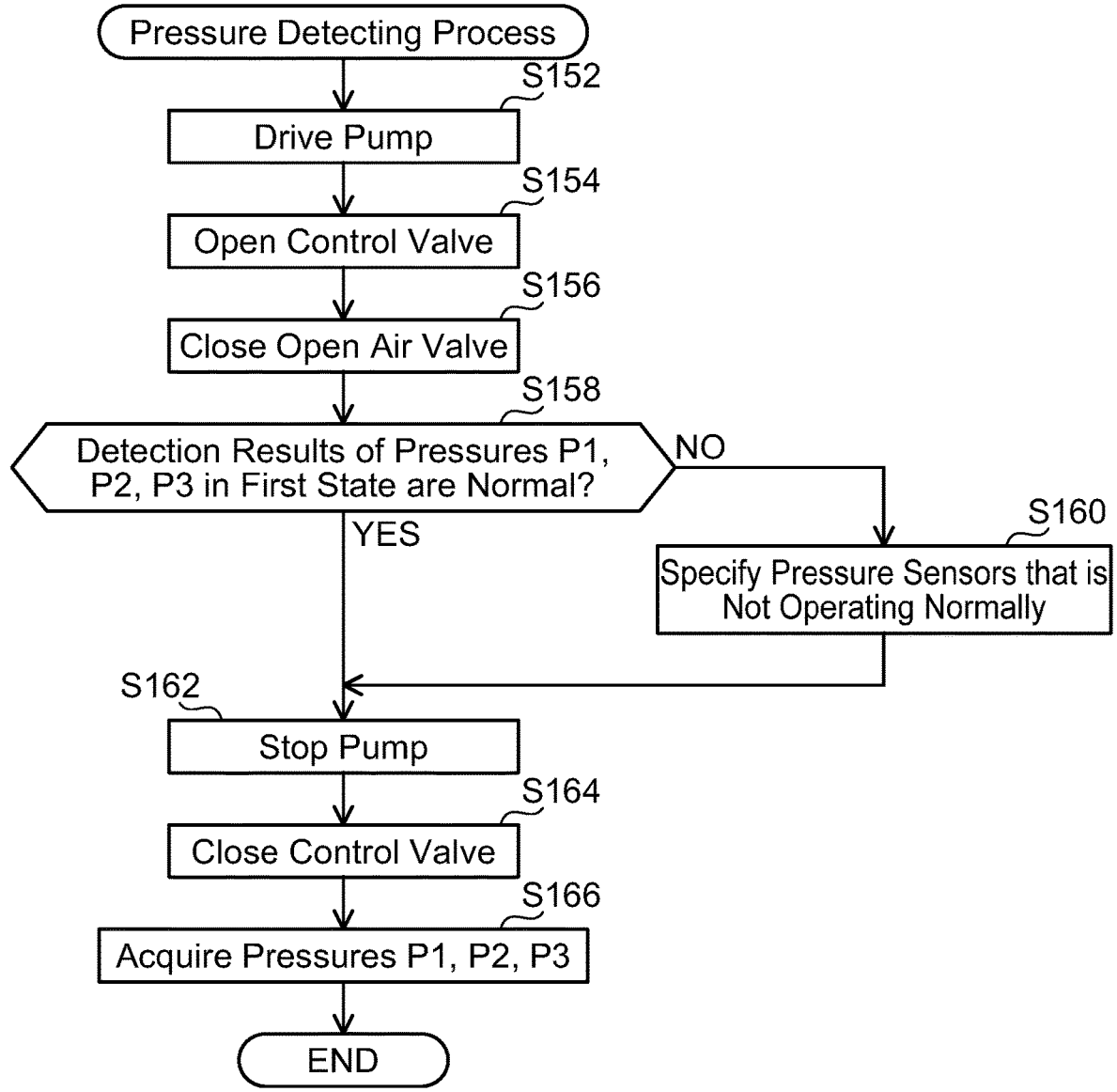

(Fifth Embodiment)

(Sixth Embodiment)

(Ninth Embodiment)

EVAPORATED FUEL TREATMENT DEVICE

TECHNICAL FIELD

The description herein relates to a technique related to an evaporated fuel processing device mounted on a vehicle.

BACKGROUND ART

Japanese Patent Application Publication No. 2003-343362 describes an evaporated fuel processing device. The evaporated fuel processing device is provided with a canister configured to adsorb fuel evaporated in a fuel tank, a control valve disposed on a purge passage that communicates the canister and an intake passage, and a pressure sensor configured to detect an internal pressure in the fuel tank. The evaporated fuel processing device is configured to supply mixed gas of the evaporated fuel in the canister and air (which is hereinbelow termed "purge gas") to the intake passage through the purge passage.

The evaporated fuel processing device is configured to determine whether or not the evaporated fuel processing device is operating normally, such as whether or not the pressure sensor is operating normally, and whether or not the control valve is being driven normally. Specifically, the control valve is driven to be in opened and closed states while an engine is driven. As a result of this, the internal pressure in the fuel tank is reduced by an influence of a negative pressure in the intake passage. According to a detection result by the pressure sensor at this occasion, the evaporated fuel processing device determines whether or not the evaporated fuel processing device is operating normally.

The evaporated fuel processing device as above executes the determination on whether or not the evaporated fuel processing device is operating normally by using the negative pressure generated in the intake passage by the engine being driven. Due to this, the above determination must be executed while the engine is driven.

The description herein provides a technique that allows determination to be made that an evaporated fuel processing device is not operating normally without using a pressure change generated by an engine being driven.

The technique disclosed herein relates to an evaporated fuel processing device. This evaporated fuel processing device may comprise: a canister configured to communicate with a fuel tank though a tank passage, communicate with an intake passage of an engine through a purge passage, and communicate with open air through an open air passage; a control valve disposed on the purge passage and configured to switch between a closed state and an open state, the closed state being a state of closing the purge passage, and the open state being a state of opening the purge passage; a pump configured to change a pressure in a communicating space in a case where the control valve is in the closed state, the communicating space defined by the fuel tank, the tank passage, the canister, the open air passage, and the purge passage on a side closer to the canister relative to the control valve which communicate with one another; a pressure detector disposed on at least one of the fuel tank, the tank passage, the canister, the open air passage, and the purge passage on the side closer to the canister relative to the control valve; and a determining unit configured to determine that the evaporated fuel processing device is not operating normally by using a pressure detection result by the pressure detector in a state where the control valve is in the closed state and the pressure in the communicating space is changed by the pump.

In this configuration, the pressure in the communicating space is changed by the pump. According to this configuration, the pressure change by the pump is detected by the pressure sensor, and the pressure detection result thereof is used to determine that the evaporated fuel processing device is not operating normally. Due to this, the determination that the evaporated fuel processing device is not operating normally may be made without using the pressure change generated by an engine being driven. As a result, the determination that the evaporated fuel processing device is not operating normally may be made even when the engine is stopped.

The determining unit may be configured to determine that the evaporated fuel processing device is not operating normally by further using a pressure detection result by the pressure detector in a state where the communicating space communicates with the open air. According to this configuration, the determination that the evaporated fuel processing device is not operating normally may be made by using the pressure detection results in two different states, namely, a state in which the pressure in the communicating space approximates an atmospheric pressure and a state in which the pressure in the communicating space is changed by the pump.

The evaporated fuel processing device may further comprise a temperature detector configured to detect a temperature within the pump. In the state where the control valve is in the closed state and the pressure in the communicating space is changed by the pump, the determining unit is configured to determine that the evaporated fuel processing device is not operating normally by using a temperature detection result by the temperature detector and a pressure detection result by the pressure detector at a first timing, and by using a temperature detection result by the temperature detector and a pressure detection result by the pressure detector at a second timing, the second timing being a timing after the temperature within the pump has been increased by the pump being driven from the first timing. The pressure change by the pump varies according to a temperature of gas in the pump. According to this configuration, the determination that the evaporated fuel processing device is not operating normally may be made by taking account of the pressure change caused by the temperature change in the gas within the pump.

The second timing may be a timing at which or after when gas within the pump, of which temperature has been increased by the pump being driven and has become stable from the first timing, reaches the temperature detector. According to this configuration, the pressure detection result by the pressure detector after the temperature in the pump has become stable may be used.

The determining unit may be configured to determine that the evaporated fuel processing device is not operating normally by using a pressure detection result by the pressure detector in a state where the control valve is in the closed state and the pressure in the communicating space is changed by the pump being driven with a first rotational speed, and a pressure detection result by the pressure detector in a state where the control valve is in the closed state and the pressure in the communicating space is changed by the pump being driven with a second rotational speed which is different from the first rotational speed. According to this configuration, the determination that the evaporated fuel processing device is not operating normally may be made by using the pressure detection results in two states with different pressures in the communicating space created by changing the rotational speed of the pump.

The evaporated fuel processing device may further comprise a concentration acquiring unit configured to acquire an evaporated fuel concentration of gas supplied from the purge passage to the intake passage in a case where the control valve is in the open state. The determining unit may be configured to determine that the evaporated fuel processing device is not operating normally while the evaporated fuel concentration is stable. When the evaporated fuel concentration of the gas changes, a density of the gas thereby changes. As a result, the pressure change generated by the pump varies. According to this configuration, a variation in the pressure caused by the evaporated fuel concentration may be suppressed.

The pressure detector may comprise a plurality of pressure detecting units, and the plurality of pressure detecting units may be disposed at a plurality of positions within the communicating space, respectively. The determining unit may be configured to determine that the evaporated fuel processing device is not operating normally by using pressure detection results by the plurality of pressure detecting units. According to this configuration, determination may be made, for each of the plurality of pressure detectors in the evaporated fuel device, that it is not operating normally The evaporated fuel processing device may further comprise an open air valve configured to switch between an open air communicating state and an open air non-communicating state, the open air communicating state being a state where the canister communicates with the open air through the open air passage, and the open air non-communicating state being a state where the canister does not communicate with the open air through the open air passage. The pressure detector may be configured to detect the pressure in the communicating space between the open air valve and the pump. The determining unit may be configured to determine that the evaporated fuel processing device is not operating normally by using a pressure detection result by the pressure detector in a state where the pressure in the communicating space is changed by the pump and the control valve is in the closed state after the pump has stopped and the control valve has switched to the closed state from the open state as a result of the pump having been driven while the open air valve is in the open air non-communicating state and the control valve is in the open state. In this configuration, the communicating space is brought to have a negative pressure by the pump being driven, after which the communicating space is cut off from the open air by the control valve being switched to the closed state. According to this configuration, the determination that the evaporated fuel processing device is not operating normally may be made by using the pressure detection result for the communicating space cut off from the open air.

The pump may be disposed on the purge passage between the control valve and the canister. The pressure detector may comprise a first detector configured to detect a pressure in the purge passage on a side closer to the control valve relative to the pump, a second detector configured to detect a pressure in the communicating space between the open air valve and the pump, and a third detector disposed for detecting a pressure in the fuel tank. The determining unit may be configured to determine that the first detector, the second detector and the third detector are not operating normally respectively by using pressure detection results by the first detector, the second detector and the third detector under the first situation. For example, in a case where the pump is driven, pressures differ on an upstream side (that is, a canister side) and on a downstream side (that is, a control valve side) relative to the pump. According to this configuration, pressures at different positions in the communicating space may be detected by using the first detector, the second detector, and the third detector. Further, for each of the first detector, the second detector and the third detector, determination that it is not operating normally can be made.

The pump may be configured to supply evaporated fuel in the canister to the intake passage while the engine is driven and the control valve is in the open state. According to this configuration, the evaporated fuel may be supplied to the intake passage by using the pump even in a case where the negative pressure generated by the engine being driven is low.

BRIEF DESCRIPTION OF DRAWINGS

FIG. 19 shows a flowchart of a pressure detecting process according to a fourth embodiment;
FIG. 20 shows a table for explaining a first state and a second state according to the fourth embodiment.

DESCRIPTION OF EMBODIMENTS

First Embodiment

Figure 1:
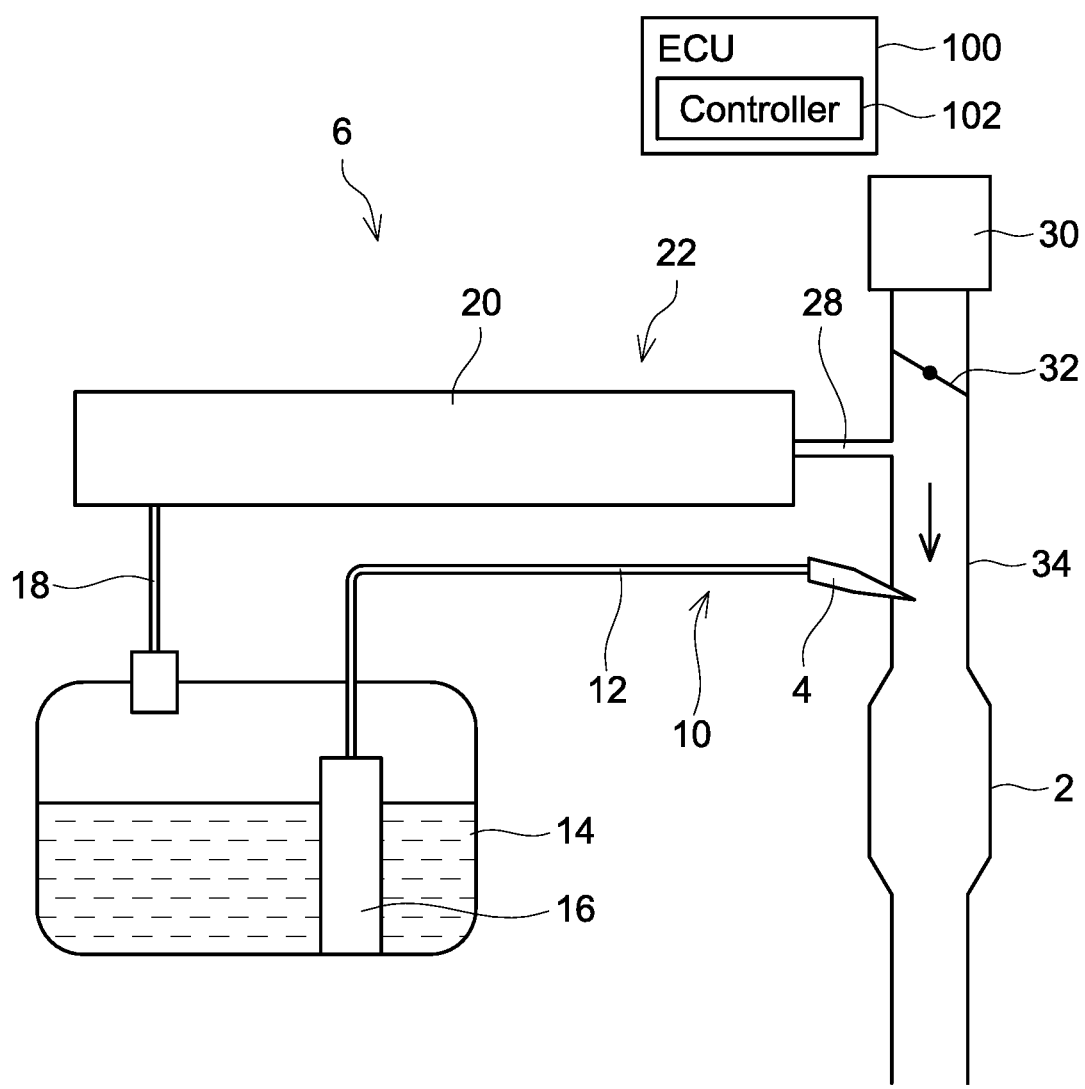
FIG. 1 shows an overview of a fuel supply system of an automobile.

A fuel supply system 6 provided with an evaporated fuel processing device 20 will be described with reference to FIG. 1. The fuel supply system 6 is provided with a main supply passage 10 for supplying fuel stored in a fuel tank 14 to an engine 2 and a purge supply passage 22 for supplying evaporated fuel generated in the fuel tank 14 to the engine 2.

The main supply passage 10 is provided with a fuel pump unit 16, a supply passage 12, and an injector 4. The fuel pump unit 16 is provided with a fuel pump, a pressure regulator, a control circuit, and the like. The fuel pump unit 16 controls the fuel pump according to a signal supplied from an ECU 100. The fuel pump increases pressure of the fuel in the fuel tank 14 and discharges the same. The pressure of the fuel discharged from the fuel pump is regulated by the pressure regulator, and the fuel is supplied from the fuel pump unit 16 to the supply passage 12. The supply passage 12 is connected to the fuel pump unit 16 and the injector 4. The fuel supplied to the supply passage 12 passes through the supply passage 12 and reaches the injector 4. The injector 4 includes a valve (not shown) of which aperture is controlled by the ECU 100. When the valve of the injector 4 is opened, the fuel in the supply passage 12 is supplied to an intake passage 34 connected to the engine 2.

The intake passage 34 is connected to an air cleaner 30. The air cleaner 30 is provided with a filter that removes foreign particles in air that flows into the intake passage 34. A throttle valve 32 is provided in the intake passage 34 between the engine 2 and the air cleaner 30. When the throttle valve 32 opens, air is suctioned from the air cleaner 30 toward the engine 2 as indicated by a down arrow in FIG. 1. The throttle valve 32 adjusts an aperture of the intake passage 34 and adjusts a quantity of air flowing into the engine 2. The throttle valve 32 is provided on an upstream side (air cleaner 30 side) than the injector 4.

Figure 2:
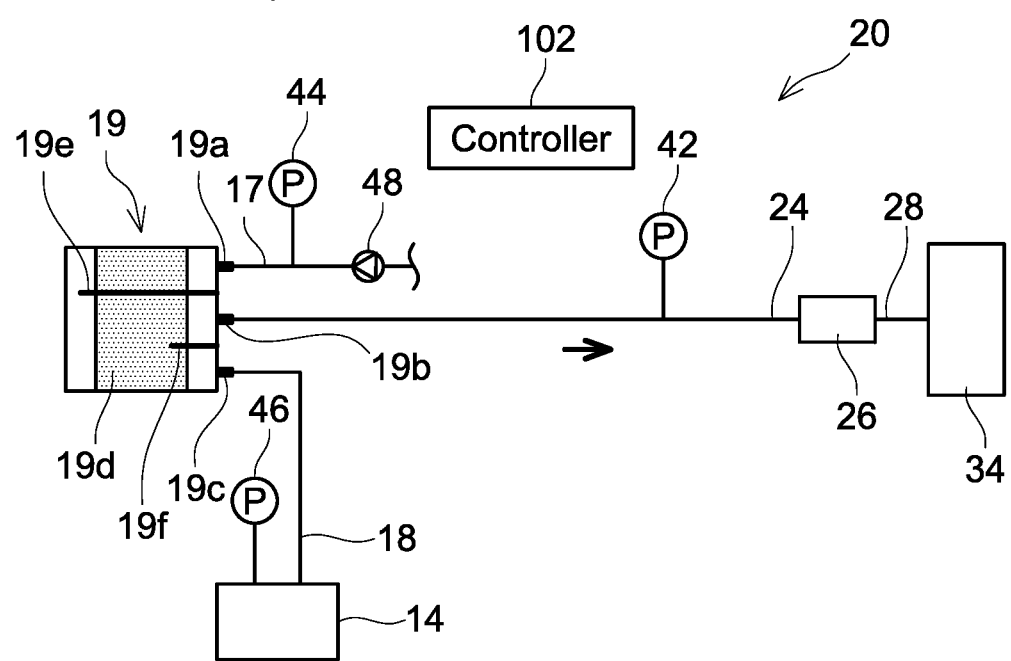
FIG. 2 shows an overview of an evaporated fuel processing device according to a first embodiment.

The purge supply passage 22 is disposed aside the main supply passage 10. The purge supply passage 22 is a passage through which mixed gas of evaporated fuel from a canister 19 and air (the "mixied gas" is hereinbelow termed "purge gas") passes upon when the purge gas flows from the canister 19 to the intake passage 34. The evaporated fuel processing device 20 is provided on the purge supply passage 22. As shown in FIG. 2, the evaporated fuel processing device 20 is provided with the canister 19, a control valve 26, a first pressure sensor 42, a second pressure sensor 44, a third pressure sensor 46, a pump 48, and a controller 102 in the ECU 100.

The fuel tank 14 and the canister 19 are connected by a tank passage 18. The canister 19 is connected to the intake passage 34 via a purge passage 24. The purge passage 24 is connected to the intake passage 34 between the injector 4 and the throttle valve 32 via a communication passage 28. The control valve 26 is disposed between the purge passage 24 and the communication passage 28. The control valve 26 is a solenoid valve controlled by the controller 102, and is configured to be switched between an open state of being opened and a closed state of being closed by duty ratio control of the controller 102. The controller 102 sequentially switches the open state and the closed state of the control valve 26 according to a duty ratio determined based on an air-fuel ratio and the like. In the open state, the purge passage 24 opens to communicate the canister 19 with the intake passage 34. In the closed state, the purge passage 24 closes to cut off the communication between the canister 19 and the intake passage 34 on the purge passage 24. The control valve 26 adjusts a flow rate of the gas containing the evaporated fuel (that is, the purge gas) by controlling its opening and closed time periods (that is, controlling switching timings between the open state and the closed state). The control valve 26 may be a stepping-motor control valve of which aperture is adjustable.

The canister 19 is provided with an air port 19a, a purge port 19b, and a tank port 19c. The air port 19a is communicated with open air via an open air passage 17 and an air filter that is not shown. Air may flow from the air port 19a to the canister 19 through the open air passage 17 after having passed through the air filter. At such an occasion, the air filter prevents foreign particles in the air from entering the canister 19. The open air passage 17 has the pump 48 and the second pressure sensor 44 disposed thereon. The pump 48 is controlled by the controller 102 and pumps gas to the canister 19 through the open air passage 17 from an air filter side. A vortex pump, a centrifugal pump, and the like may be used as the pump 48. The second pressure sensor 44 detects a pressure in the open air passage 17.

The purge port 19b is connected to the purge passage 24. The tank port 19c is connected to the fuel tank 14 via the tank passage 18.

An activated charcoal 19d is accommodated in the canister 19. The ports 19a, 19b, and 19c are provided on one of wall surfaces of the canister 19 facing the activated charcoal 19d. A space exists between the activated charcoal 19d and the inner wall of the canister 19 on which the ports 19a, 19b, and 19c are provided. A first partitioning plate 19e and a second partitioning plate 19f are fixed to the inner wall of the canister 19 on a side where the ports 19a, 19b, and 19c are provided. The first partitioning plate 19e partitions the space between the activated charcoal 19d and the inner wall of the canister 19 in a range between the air port 19a and the purge port 19b. The first partitioning plate 19e extends to a space on an opposite side from the side where the ports 19a, 19b, and 19c are provided. The second partitioning plate 19f partitions the space between the activated charcoal 19d and the inner wall of the canister 19 in a range between the purge port 19b and the tank port 19c.

The activated charcoal 19d adsorbs the evaporated fuel from the gas that flows into the canister 19 from the fuel tank 14 through the tank passage 18 and the tank port 19c. The gas after the evaporated fuel has been adsorbed is discharged to open air by passing through the air port 19a and the open air passage 17. The canister 19 can prevent the evaporated fuel in the fuel tank 14 from being discharged to open air. The evaporated fuel adsorbed by the activated charcoal 19d is supplied to the purge passage 24 from the purge port 19b. The first partitioning plate 19e partitions the space where the air port 19a is connected and the space where the purge port 19b is connected. The first partitioning plate 19e prevents the gas containing the evaporated fuel from being discharged to open air. The second partitioning plate 19f partitions the space where the purge port 19b is connected and the space where the tank port 19c is connected. The second partitioning plate 19f prevents the gas flowing into the canister 19 from the tank port 19c from moving directly to the purge passage 24.

The purge passage 24 has the first pressure sensor 42 disposed thereon. The first pressure sensor 42 detects a pressure in the purge passage 24. The fuel tank 14 has the third pressure sensor 46 disposed thereon. The third pressure sensor 46 detects a pressure in the fuel tank 14.

The controller 102 is connected to the pump 48, the control valve 26, and the first to third pressure sensors 42, 44, 46. The controller 102 includes a CPU and a memory such as ROM and RAM. The controller 102 controls the pump 48 and the control valve 26. Further, the controller 102 acquires detection results of the first to third pressure sensors 42, 44, 46.

Next, an operation of the evaporated fuel processing device 20 will be described. When a purge condition is satisfied while the engine 2 is driven, the controller 102 duty-controls the control valve 26 to execute a purge process of supplying the purge gas to the engine 2. When the purge process is executed, the purge gas is supplied in a direction shown by an arrow in FIG. 2. The purge condition is a condition that is satisfied in a case where the purge process of supplying the purge gas to the engine 2 is to be executed, and is a condition set in the controller 102 in advance by a manufacturer based on a cooling water temperature for the engine 2, an evaporated fuel concentration of the purge gas (hereinbelow termed "purge concentration"), and the like. The controller 102 constantly monitors whether or not the purge condition is satisfied while the engine 2 is driven. The controller 102 controls the duty ratio for the control valve 26 based on the purge concentration and an air flowmeter (not shown) disposed on the intake passage 34. The air flowmeter measures a quantity of air supplied to the engine 2 through the intake passage 34. Due to this, the purge gas that was adsorbed in the canister 19 is introduced into the engine 2.

When executing the purge process, the controller 102 supplies the purge gas to the intake passage 34 by using a negative pressure generated in the intake passage 34 by the engine 2 being driven. The controller 102 can supply the purge gas to the intake passage 34 also by driving the pump 48. Therefore, the purge gas can be supplied even when the negative pressure in the intake passage 34 is small. The controller 102 may drive and stop the pump 48 during the purge process according to a supply state of the purge gas.

The ECU 100 controls an aperture of the throttle valve 32. Further, the ECU 100 also controls a fuel injection amount of the injector 4. Specifically, the ECU 100 controls an opening time period of the valve of the injector 4 to control the fuel injection amount. When the engine 2 is driven, the ECU 100 calculates a fuel injection time period per unit time (that is, the opening time period of the injector 4) during which injection from the injector 4 to the engine 2 is performed. The fuel injection time period is calculated by correcting a reference injection time period specified in advance by experiments by using a feedback correction coefficient to maintain an air-fuel ratio at a target air-fuel ratio (such as an ideal air-fuel ratio). An air-fuel ratio sensor is disposed on a discharge passage of the engine 2.

The controller 102 uses the first to third pressure sensors 42, 44, 46 and the pump 48 to execute a leak detection for the evaporated fuel processing device 20 and the fuel tank 14. Specifically, the pump 48 is driven while the control valve 26 is in the closed state. At this occasion, a pressure in the evaporated fuel processing device 20, more specifically, a pressure in a communicating space 15 that is defined by the canister 19, the open air passage 17, the tank passage 18, the purge passage 24 and the fuel tank 14, is increased by the pump 48 and becomes higher than an atmospheric pressure. However, when there is a leak in the communicating space 15, the pressure in the communicating space 15 becomes lower than its expected pressure. As such, the controller 102 can detect the leak in the communicating space 15.

Further, the controller 102 executes a process of determining that the first to third pressure sensors 42, 44, 46 and the pump 48 are not operating normally. This process includes a pressure detecting process shown in FIG. 3 and a normality determining process shown in FIGS. 5 to 8. The controller 102 executes the pressure detecting process first.

The pressure detecting process is executed while a vehicle is stopped. The control valve 26 is in the closed state and the pump 48 is stopped while the vehicle is stopped. In S12, the controller 102 determines whether or not the respective detection results from the first to third pressure sensors 42, 44, 46 are equal to the atmospheric pressure. The controller 102 compares the atmospheric pressure which the ECU 100 acquired from an atmospheric pressure sensor (not shown) mounted on the vehicle with the detection results from the respective first to third pressure sensors 42, 44, 46. In a case where any of the detection results from the first to third pressure sensors 42, 44, 46 is not equal to the atmospheric pressure (NO in S12), the controller 102 specifies the pressure sensor(s), of which detection result(s) is not equal to the atmospheric pressure, from among the first to third pressure sensors 42, 44, 46 in S14, and proceeds to S16.

In a case where all the detection results of the first to third pressure sensors 42, 44, 46 are equal to the atmospheric pressure (YES in S12), S14 is skipped and the process is proceeded to S16.

In S16, the controller 102 drives the pump 48 at a predetermined rotational speed (such as 12000 rpm). Then, in S18, the controller 102 acquires pressures P1, P2, P3, which are respectively the detection results of the first to third pressure sensors 42, 44, 46, and terminates the pressure detecting process.

Figures 3, 4:
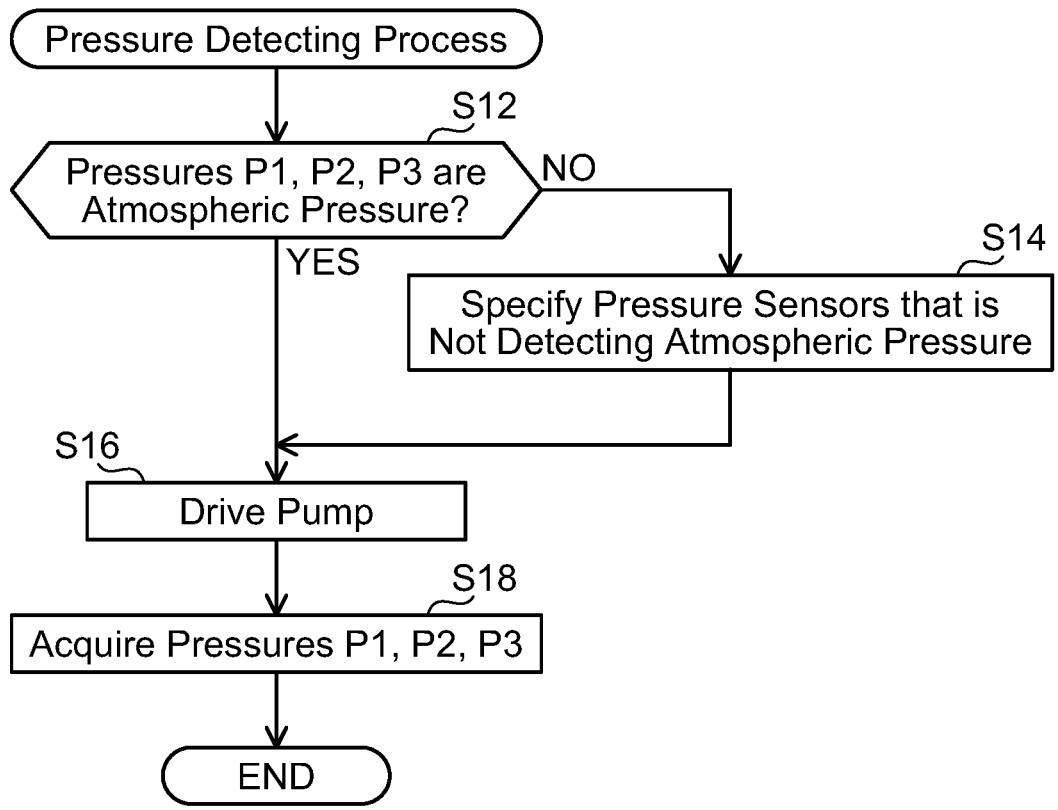
FIG. 3 shows a flowchart of a pressure detecting process according to the first embodiment.
FIG. 4 shows a table for explaining a first state and a second state according to the first embodiment.

As shown in FIG. 4, a first state in which the pump 48 is stopped and the control valve 26 is maintained in the closed state is achieved in S12. In the first state, the pressure in the communicating space 15 matches the atmospheric pressure because the communicating space 15 is communicated with the open air. Due to this, the pressures P1, P2, P3 are all equal to the atmospheric pressure in the first state in the case where the first to third pressure sensors 42, 44, 46 are operating normally. Further, a second state in which the pump 48 is driven and the control valve 26 is maintained in the closed state is achieved in S18. In the second state, the pressure in the communicating space 15 is increased by the pump 48, as a result of which the communicating space 15 comes to have a positive pressure higher than the atmospheric pressure. The pressures P1, P2, P3 are each a positive pressure in the second state in the case where the first to third pressure sensors 42, 44, 46 are operating normally. The pressure in the communicating space 15 in the second state is dependent on the rotational speed of the pump 48.

Figure 5:
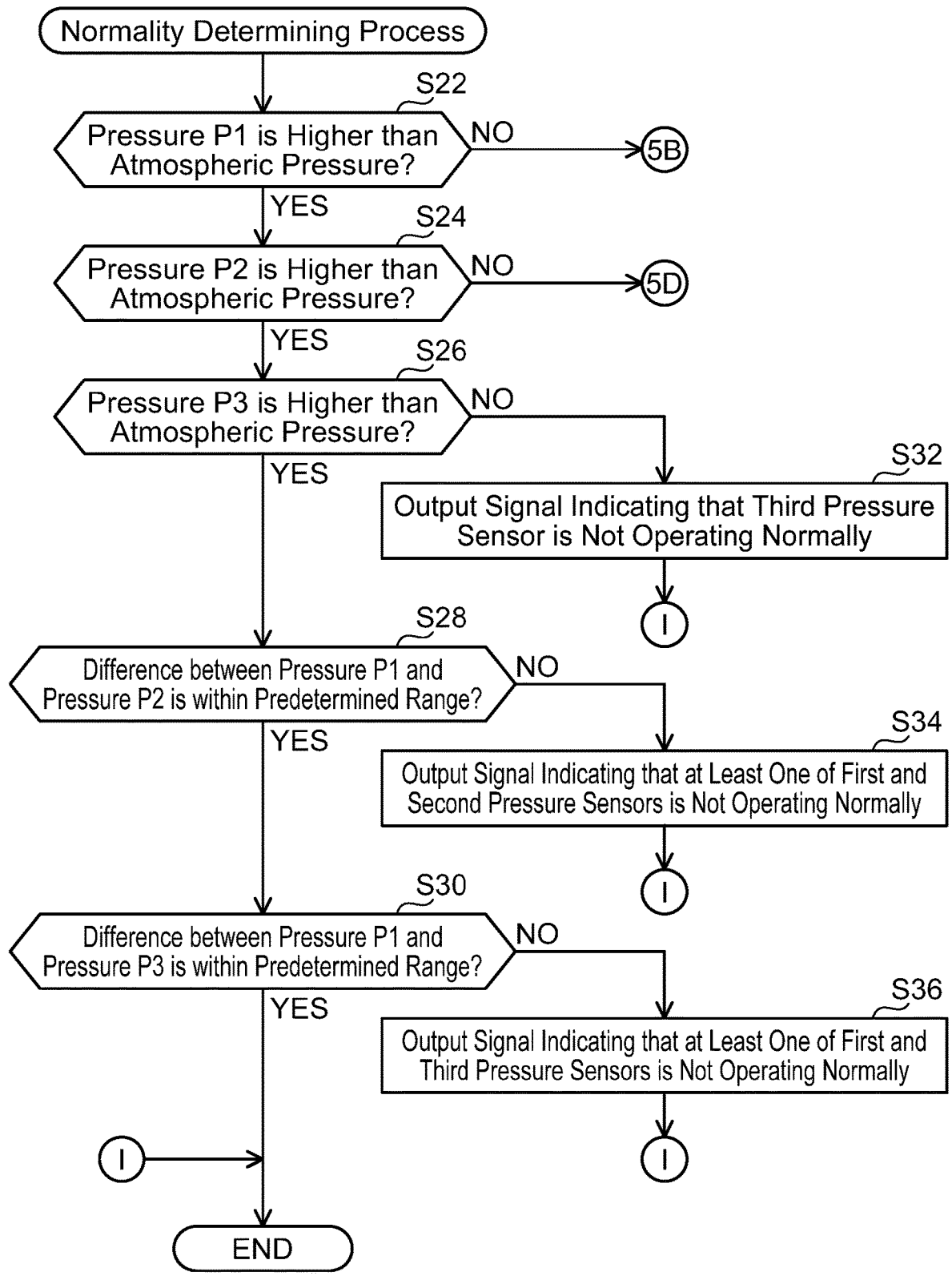
FIG. 5 shows a flowchart of a normality determining process according to the first embodiment.

The controller 102 executes the normality determining process subsequent to the pressure detecting process. In the normality determining process, as shown in FIG. 5, the controller 102 firstly determines whether or not the pressure P1, which is the detection result of the first pressure sensor 42, is higher than the atmospheric pressure in S22. In a case where the pressure P1 is higher than the atmospheric pressure (YES in S22), the controller 102 determines whether or not the pressure P2, which is the detection result of the second pressure sensor 44, is higher than the atmospheric pressure in S24. In a case where the pressure P2 is higher than the atmospheric pressure (YES in S24), the controller 102 determines whether or not the pressure P3, which is the detection result of the third pressure sensor 46, is higher than the atmospheric pressure in S26.

In a case where the pressure P3 is higher than the atmospheric pressure (YES in S26), the controller 102 determines in S28 whether or not a difference between the pressure P1 and the pressure P2 is within a predetermined range. In a case where both the first pressure sensor 42 and the second pressure sensor 44 are operating normally, the pressure P1 and the pressure P2 substantially match. The pressure P1 and the pressure P2 may slightly differ from each other due to detection errors in the first pressure sensor 42 and the second pressure sensor 44. The predetermined range is, for example, ±2 kPa, taking into account the detection errors in the first pressure sensor 42 and the second pressure sensor 44.

In a case where the difference between the pressure P1 and the pressure P2 is within the predetermined range (YES in S28), the controller 102 determines in S30 whether or not a difference between the pressure P1 and the pressure P3 is within the predetermined range, similarly to S28. In a case where both the first pressure sensor 42 and the third pressure sensor 46 are operating normally, the pressure P1 and the pressure P3 substantially match. In a case where the difference between the pressure P1 and the pressure P3 is within the predetermined range (YES in S30), the normality determining process is terminated. In the case where the normality determining process is terminated by the controller 102 determining YES in S30, the first pressure sensor 42, the second pressure sensor 44, and the third pressure sensor 46 are all determined as being normal.

On the other hand, in a case where the difference between the pressure P1 and the pressure P3 is not within the predetermined range (NO in S30), at least one of the first pressure sensor 42 and the third pressure sensor 46 is highly likely not normally detecting the pressure. In the case of NO in S30, the controller 102 determines that at least one of the first pressure sensor 42 and the third pressure sensor 46 is not operating normally in S36. Then, the controller 102 outputs a signal indicating that at least one of the first pressure sensor 42 and the third pressure sensor 46 is not operating normally to a display device of the vehicle, and terminates the normality determining process. At this occasion, the display device displays information indicating that at least one of the first pressure sensor 42 and the third pressure sensor 46 is not operating normally.

In S36, the controller 102 also outputs information indicating that the pressure sensor(s) specified in S14 of FIG. 3 is not operating normally. In each process of outputting a signal to the display device that are to be described hereinbelow, namely, in S32, S34, S42, S44, S48, S50, S54, S58 and S60 as well, the controller 102 outputs information indicating that the pressure sensor(s) specified in S14 of FIG. 3 is not operating normally.

Further, in a case where the difference between the pressure P1 and the pressure P2 is not within the predetermined range in S28 (NO in S28), at least one of the first pressure sensor 42 and the second pressure sensor 44 is highly likely not normally detecting the pressure. In the case of NO in S28, the controller 102 determines in S34 that at least one of the first pressure sensor 42 and the second pressure sensor 44 is not operating normally. Then, the controller 102 outputs a signal indicating that at least one of the first pressure sensor 42 and the second pressure sensor 44 is not operating normally to the display device of the vehicle, and terminates the normality determining process. At this occasion, the display device displays information indicating that at least one of the first pressure sensor 42 and the second pressure sensor 44 is not operating normally.

In a case where the pressure P3 is not higher than the atmospheric pressure in S26 (NO in S26), the controller 102 determines in S32 that the third pressure sensor 46 is not operating normally, outputs a signal indicating that the third pressure sensor 46 is not operating normally to the display device of the vehicle, and terminates the normality determining process. At this occasion, the display device displays information indicating that the third pressure sensor 46 is not operating normally.

Figure 6:
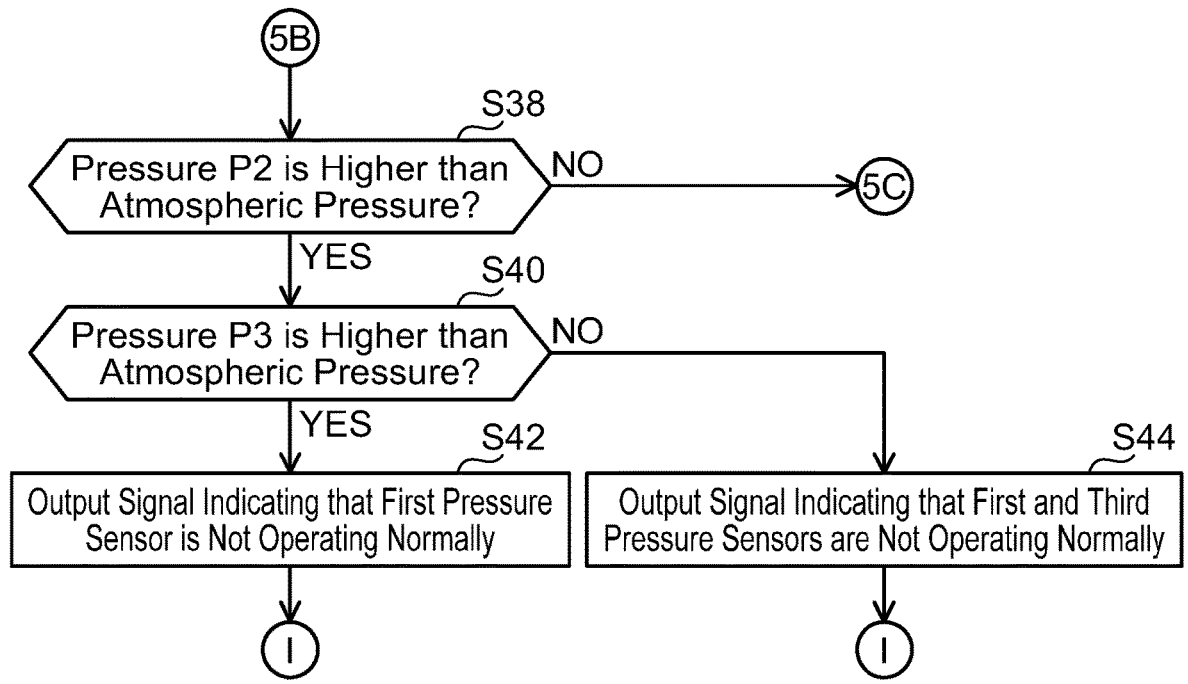
FIG. 6 shows a flowchart continuing from FIG. 5.

Meanwhile, in a case where the pressure P1 is not higher than the atmospheric pressure in S22 (NO in S22), as shown in FIG. 6, the controller 102 determines in S38 whether or not the pressure P2 is higher than the atmospheric pressure, similarly to S24. In a case where the pressure P2 is higher than the atmospheric pressure (YES in S38), the controller 102 determines in S40 whether or not the pressure P3 is higher than the atmospheric pressure, similarly to S26.

In a case where the pressure P3 is higher than the atmospheric pressure (YES in S40), the controller 102 determines in S42 that the first pressure sensor 42 is not operating normally, outputs a signal indicating that the first pressure sensor 42 is not operating normally to the display device of the vehicle, and terminates the normality determining process. At this occasion, the display device displays information indicating that the first pressure sensor 42 is not operating normally.

On the other hand, in a case where the pressure P3 is not higher than the atmospheric pressure (NO in S40), the controller 102 determines in S44 that the first pressure sensor 42 and the third pressure sensor 46 are not operating normally, outputs a signal indicating that the first pressure sensor 42 and the third pressure sensor 46 are not operating normally to the display device of the vehicle, and terminates the normality determining process. At this occasion, the display device displays information indicating that the first pressure sensor 42 and the third pressure sensor 46 are not operating normally.

Figure 7:
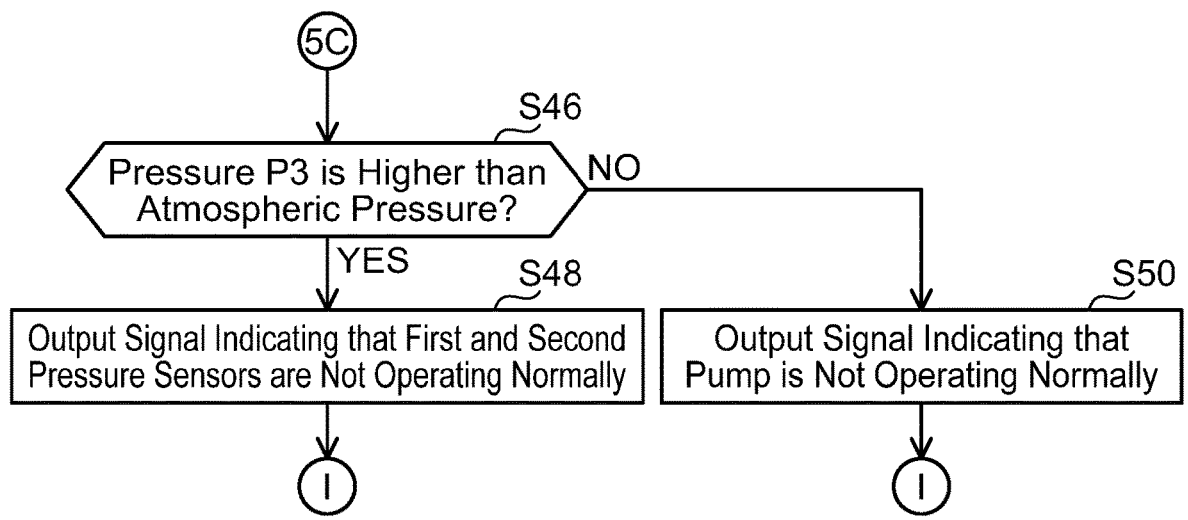
FIG. 7 shows a flowchart continuing from FIG. 6.

In a case where the pressure P2 is not higher than the atmospheric pressure in S38 (NO in S38), as shown in FIG. 7, the controller 102 determines in S46 whether or not the pressure P3 is higher than the atmospheric pressure, similarly to S26.

In a case where the pressure P3 is higher than the atmospheric pressure (YES in S46), the controller 102 determines in S48 that the first pressure sensor 42 and the second pressure sensor 44 are not operating normally, outputs a signal indicating that the first pressure sensor 42 and the second pressure sensor 44 are not operating normally to the display device of the vehicle, and terminates the normality determining process. At this occasion, the display device displays information indicating that the first pressure sensor 42 and the second pressure sensor 44 are not operating normally.

On the other hand, in a case where the pressure P3 is not higher than the atmospheric pressure (NO in S46), the controller 102 determines in S50 that the pump 48 is not operating normally, outputs a signal indicating that the pump 48 is not operating normally to the display device of the vehicle, and terminates the normality determining process. At this occasion, the display device displays information indicating that the pump 48 is not operating normally. In the case of NO in S46, all of the first to third pressure sensors 42, 44, 46 are not detecting their expected pressures. However, it is unlikely that all of the first to third pressure sensors 42, 44, 46 fail at a same timing. In this case, it is highly likely that the pump 48 is not operating normally and fails to increase the pressure in the communicating space 15 to a positive pressure, thus the signal indicating that the pump 48 is not operating normally is outputted.

Figure 8:
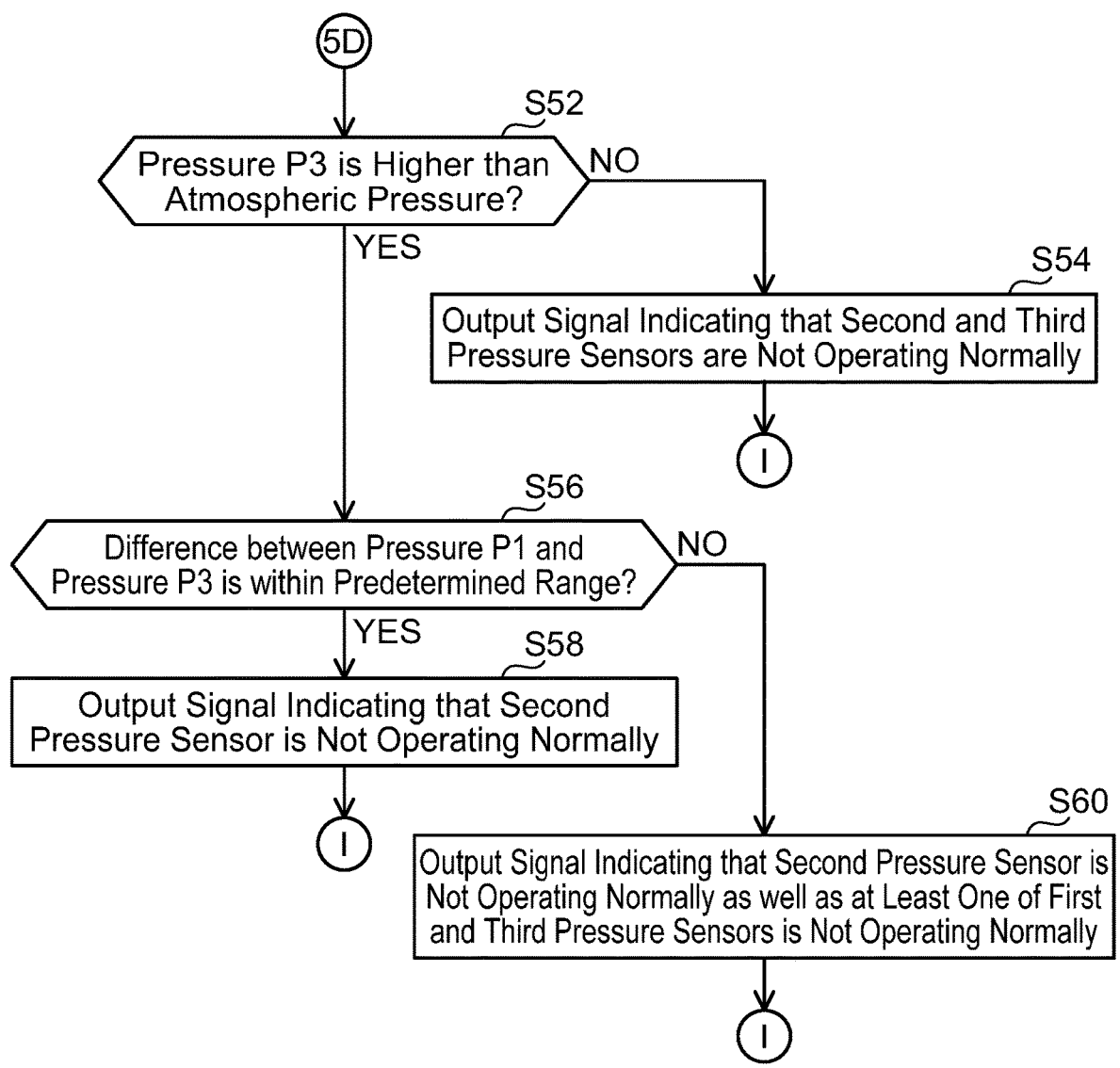
FIG. 8 shows a flowchart continuing from FIG. 5.

In a case where the pressure P2 is not higher than the atmospheric pressure in S24 of FIG. 5 (NO in S24), as shown in FIG. 8, the controller 102 determines in S52 whether or not the pressure P3 is higher than the atmospheric pressure, similarly to S26.

In a case where the pressure P3 is higher than the atmospheric pressure (YES in S52), the controller 102 determines in S56 whether or not the difference between the pressure P1 and the pressure P3 is within the predetermined range, similarly to S30. In a case where the difference between the pressure P1 and the pressure P3 is within the predetermined range (YES in S56), the controller 102 determines that the second pressure sensor 44 is not operating normally in S58, outputs a signal indicating that the second pressure sensor 44 is not operating normally to the display device of the vehicle, and terminates the normality determining process. At this occasion, the display device displays information indicating that the second pressure sensor 44 is not operating normally.

On the other hand, in a case where the difference between the pressure P1 and the pressure P3 is not within the predetermined range (NO in S56), the controller 102 determines in S60 that the second pressure sensor 44 is not operating normally and at least one of the first pressure sensor 42 and the third pressure sensor 46 is not operating normally, outputs a signal indicating this determination result to the display device of the vehicle, and terminates the normality determining process. At this occasion, the display device displays information indicating that the second pressure sensor 44 is not operating normally and at least one of the first pressure sensor 42 and the third pressure sensor 46 is not operating normally.

In a case where the pressure P3 is not higher than the atmospheric pressure in S52 (NO in S52), the controller 102 determines in S54 that the second pressure sensor 44 and the third pressure sensor 46 are not operating normally, outputs a signal indicating this determination result to the display device of the vehicle, and terminates the normality determining process. At this occasion, the display device displays information indicating that the second pressure sensor 44 and the third pressure sensor 46 are not operating normally.

According to this configuration, a driver can acknowledge that the pressure sensor(s) displayed on the display device are not operating normally.

In the evaporated fuel processing device 20, the pressure in the communicating space 15 can be increased by the pump 48. Due to this, the determination that the evaporated fuel processing device 20 is incapable of operating normally can be made without using the negative pressure generated by the engine 2 being driven.

Further, for each of the first to third pressure sensors 42, 44, 46, the determination as to whether the pressure sensor is operating normally or not can be made by using the respective detection results of the first to third pressure sensors 42, 44, 46.

Further, for each of the first to third pressure sensors 42, 44, 46, the determination as to whether the pressure sensor is operating normally or not can be made by using the respective detection results of the first to third pressure sensors 42, 44, 46 in the first state and in the second state.

Further, the pump 48 can be used for both a function to pump the purge gas in the purge process and a function to change the pressure in the communicating space 15.

Second Embodiment

Figure 9:
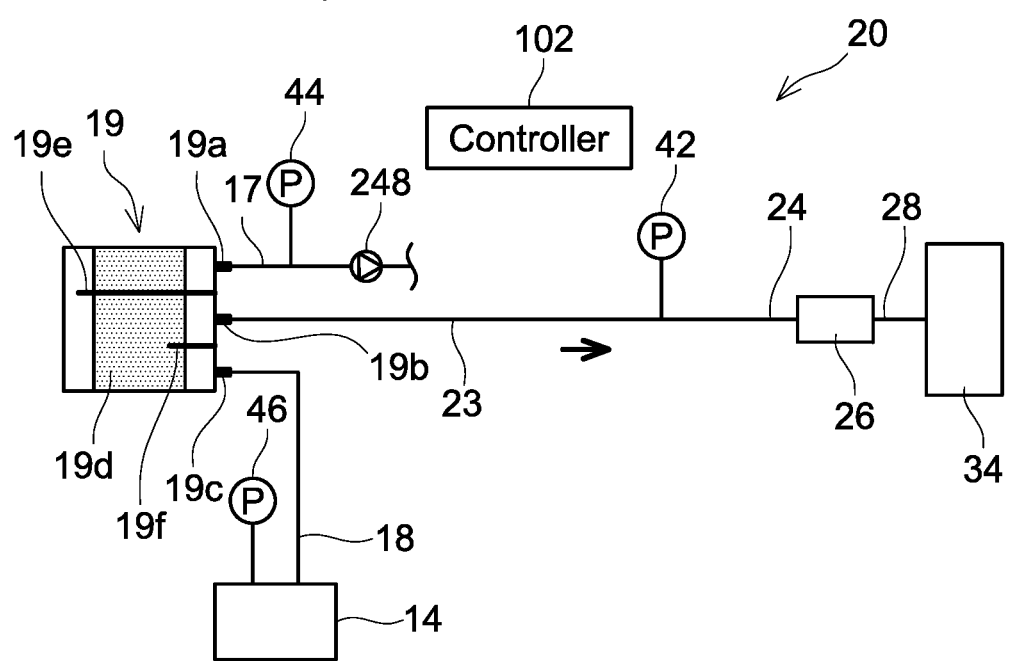
FIG. 9 shows an overview of an evaporated fuel processing device according to a second embodiment.

Differences from the first embodiment will be described. As shown in FIG. 9, an evaporated fuel processing device 20 according to the second embodiment includes a pump 248 instead of the pump 48, as compared with the evaporated fuel processing device 20 according to the first embodiment. The pump 248 is controlled by the controller 102 and is configured to pump gas from a canister 19 side to an air filter side (that is, open air side) through the open air passage 17.

The controller 102 executes a process of detecting that the first to third pressure sensors 42, 44, 46 and the pump 48 are not operating normally. This process includes a pressure detecting process shown in FIG. 10 and a normality determining process shown in FIGS. 12 to 15.

In the pressure detecting process, processes of S72 to S76 are executed similarly to S12 to S16 of FIG. 3. In S76, the pressure in the communicating space 15 is brought to have a negative pressure by the pump 48 being driven. Then, in S78, the controller 102 acquires the pressures P1, P2, P3 which respectively are the detection results of the first to third pressure sensors 42, 44, 46, and terminates the pressure detecting process.

Figures 10, 11:
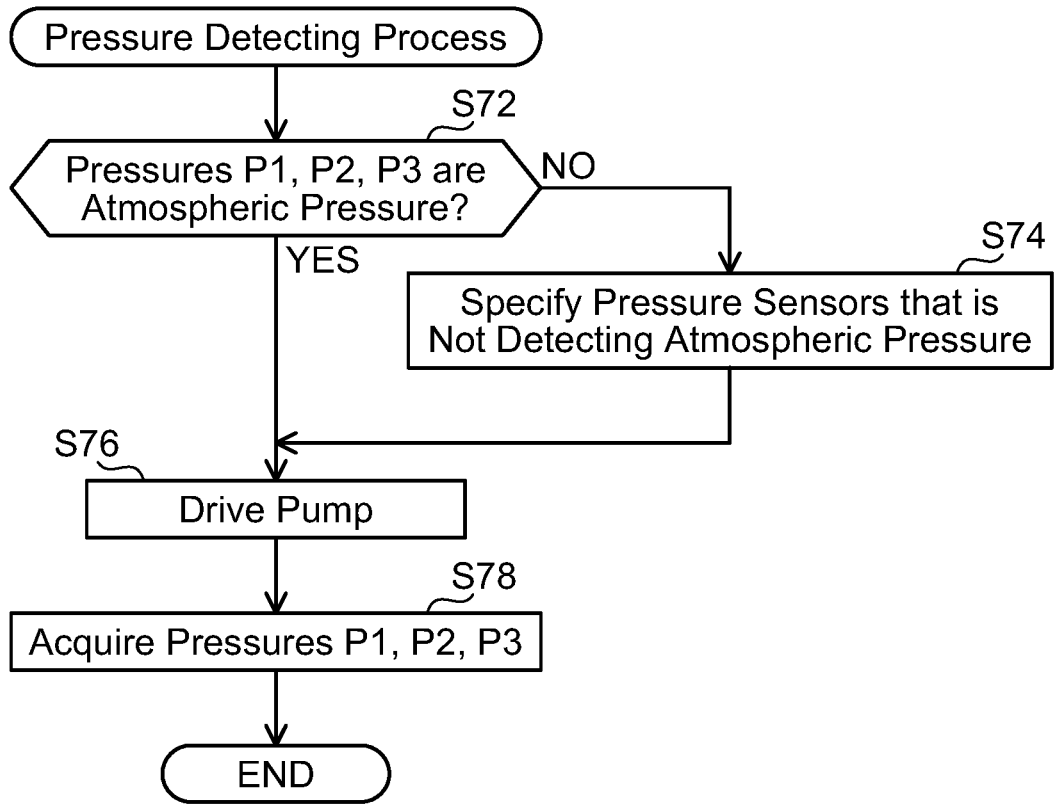
FIG. 10 shows a flowchart of a pressure detecting process according to the second embodiment.
FIG. 11 shows a table for explaining a first state and a second state according to the second embodiment.

As shown in FIG. 11, in S72, the pressure in the communicating space 15 matches the atmospheric pressure since the communicating space 15 is communicated with the open air, similarly to the first state in S12. On the other hand, the second state in which the pump 48 is driven and the control valve 26 is maintained in the closed state is achieved in S78. In this second state, the communicating space 15 has a pressure lower than the atmospheric pressure, since its pressure is reduced by the pump 48. In the case where the first to third pressure sensors 42, 44, 46 are operating normally, the pressures P1, P2, P3 are negative pressures in the second state.

Figure 12:
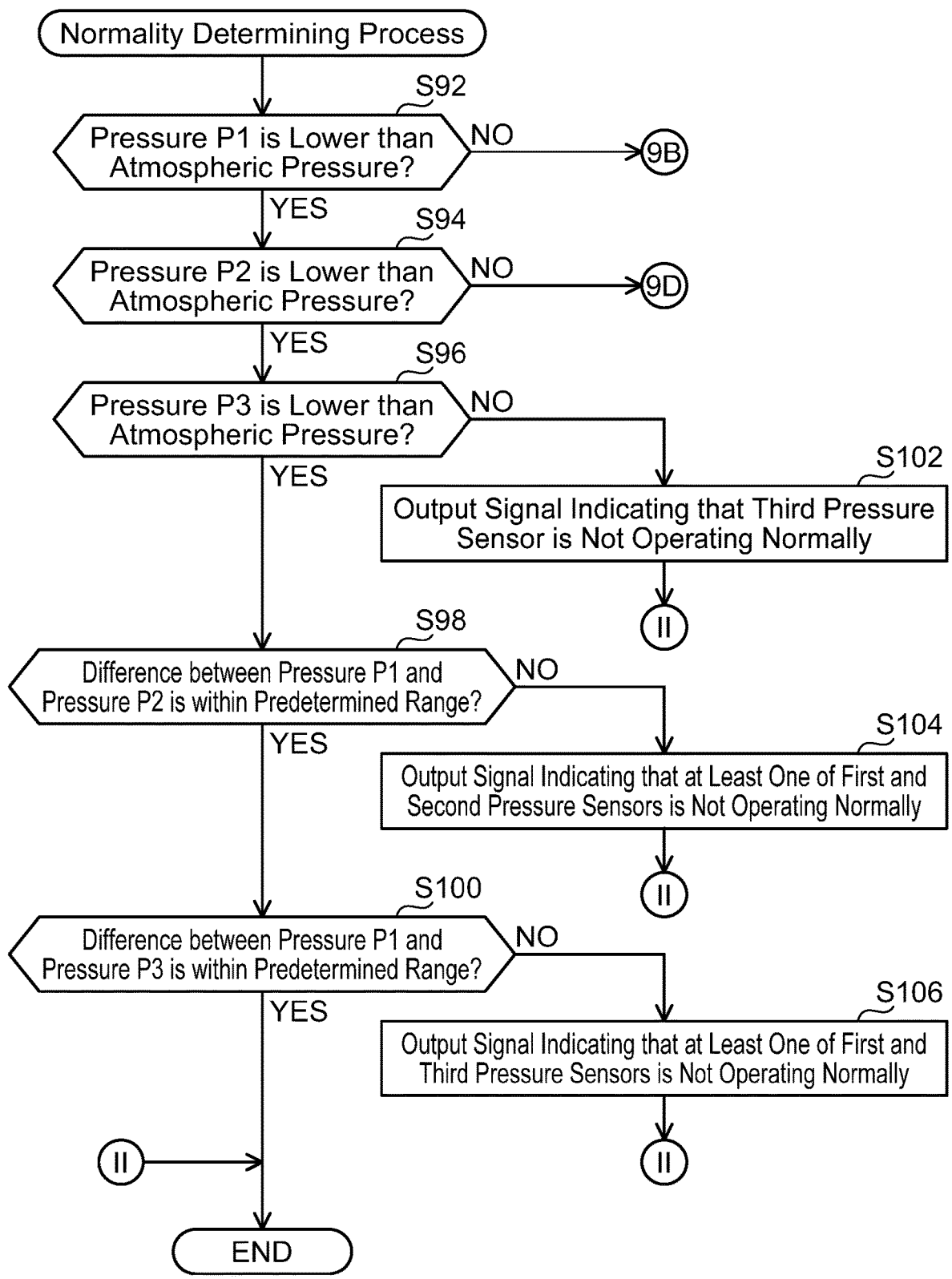
FIG. 12 shows a flowchart of a normality determining process according to the second embodiment.

The controller 102 executes the normality determining process subsequent to the pressure detecting process. In the normality determining process, as shown in FIG. 12, the controller 102 firstly determines whether or not the pressure P1 is lower than the atmospheric pressure in S92. In a case where the pressure P1 is lower than the atmospheric pressure (YES in S92), the controller 102 determines whether or not the pressure P2 is lower than the atmospheric pressure in S94. In a case where the pressure P2 is higher than the atmospheric pressure (YES in S94), the controller 102 determines in S96 whether or not the pressure P3, which is the detection result of the third pressure sensor 46, is lower than the atmospheric pressure.

In a case where the pressure P3 is lower than the atmospheric pressure (YES in S96), the controller 102 determines in S98 whether or not the difference between the pressure P1 and the pressure P2 is within a predetermined range (such as ±2 kPa). In a case where the difference between the pressure P1 and the pressure P2 is within the predetermined range (YES in S98), the controller 102 determines in S100 whether or not the difference between the pressure P1 and the pressure P3 is within the predetermined range. In a case where the difference between the pressure P1 and the pressure P3 is within the predetermined range (YES in S100), the controller 102 terminates the normality determining process. In the case where the normality determining process is terminated by the controller 102 determining YES in S100, the first pressure sensor 42, the second pressure sensor 44, and the third pressure sensor 46 are all determined as being normal.

On the other hand, in a case where the difference between the pressure P1 and the pressure P3 is not within the predetermined range (NO in S100), the controller 102 determines in S106 that at least one of the first pressure sensor 42 and the third pressure sensor 46 is not operating normally, outputs a signal indicating this determination result to the display device of the vehicle, and terminates the normality determining process. At this occasion, the display device displays information indicating that at least one of the first pressure sensor 42 and the third pressure sensor 46 is not operating normally.

In S106, the controller 102 outputs information indicating that the pressure sensor(s) specified in S74 of FIG. 10 is not operating normally, similarly to S36. In each process of outputting a signal to the display device that are to be described hereinbelow, namely, in S102, S104, S112, S114, S118, S120, S124, S128 and S130 as well, the controller 102 outputs the information indicating that the pressure sensor(s) specified in S74 of FIG. 10 is not operating normally.

Further, in a case where the difference between the pressure P1 and the pressure P2 is not within the predetermined range in S98 (NO in S98), the controller 102 determines in S104 that at least one of the first pressure sensor 42 and the second pressure sensor 44 is not operating normally, outputs a signal indicating this determination result to the display device of vehicle, and terminates the normality determining process. At this occasion, the display device displays information indicating that at least one of the first pressure sensor 42 and the second pressure sensor 44 is not operating normally.

In a case where the pressure P3 is not higher than the atmospheric pressure in S96 (NO in S96), the controller 102 determines in S102 that the third pressure sensor 46 is not operating normally, outputs a signal indicating this determination result to the display device of the vehicle, and terminates the normality determining process. At this occasion, the display device displays information indicating that the third pressure sensor 46 is not operating normally.

Figure 13:
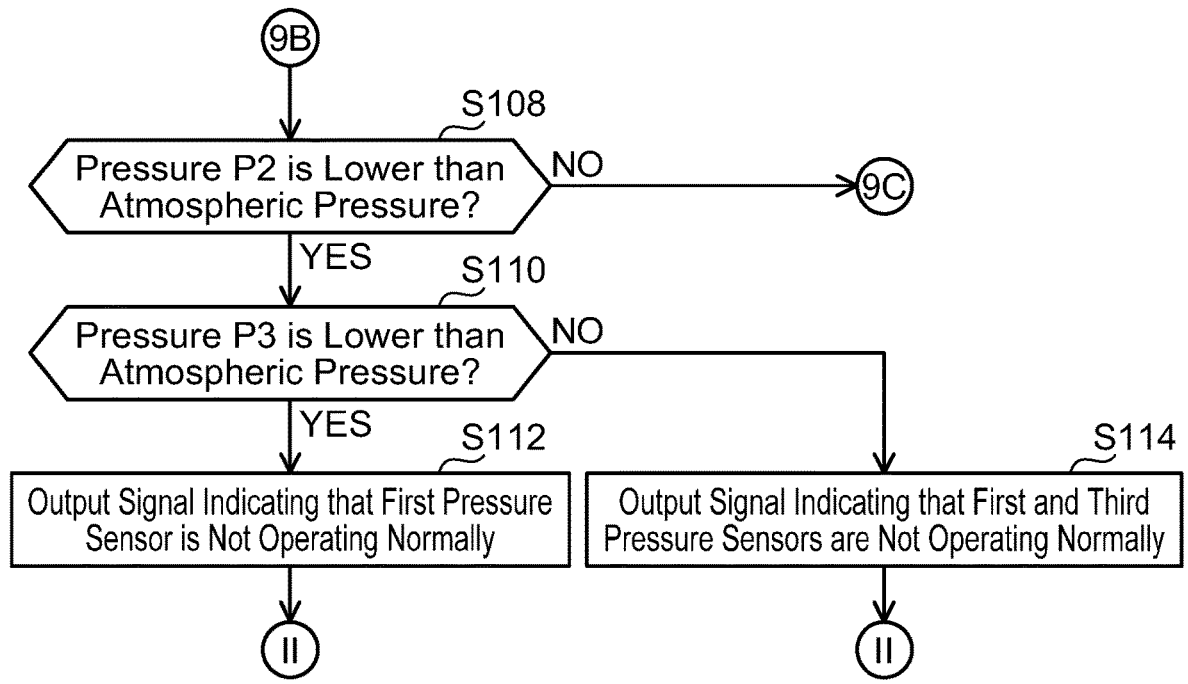
FIG. 13 shows a flowchart continuing from FIG. 12.

On the other hand, in a case where the pressure P1 is not lower than the atmospheric pressure in S92 (NO in S92), as shown in FIG. 13, the controller 102 determines in S108 whether or not the pressure P2 is lower than the atmospheric pressure, similarly to S94. In a case where the pressure P2 is lower than the atmospheric pressure (YES in S108), the controller 102 determines in S110 whether or not the pressure P3 is lower than the atmospheric pressure, similarly to S96.

In a case where the pressure P3 is lower than the atmospheric pressure (YES in S110), the controller 102 determines in S112 that the first pressure sensor 42 is not operating normally, outputs a signal indicating this determination result to the display device of the vehicle, and terminates the normality determining process. At this occasion, the display device displays information indicating that the first pressure sensor 42 is not operating normally.

On the other hand, in a case where the pressure P3 is not lower than the atmospheric pressure (NO in S110), the controller 102 determines in S114 that the first pressure sensor 42 and the third pressure sensor 46 are not operating normally, outputs a signal indicating this determination result to the display device of the vehicle, and terminates the normality determining process. At this occasion, the display device displays information indicating that the first pressure sensor 42 and the third pressure sensor 46 are not operating normally.

Figure 14:
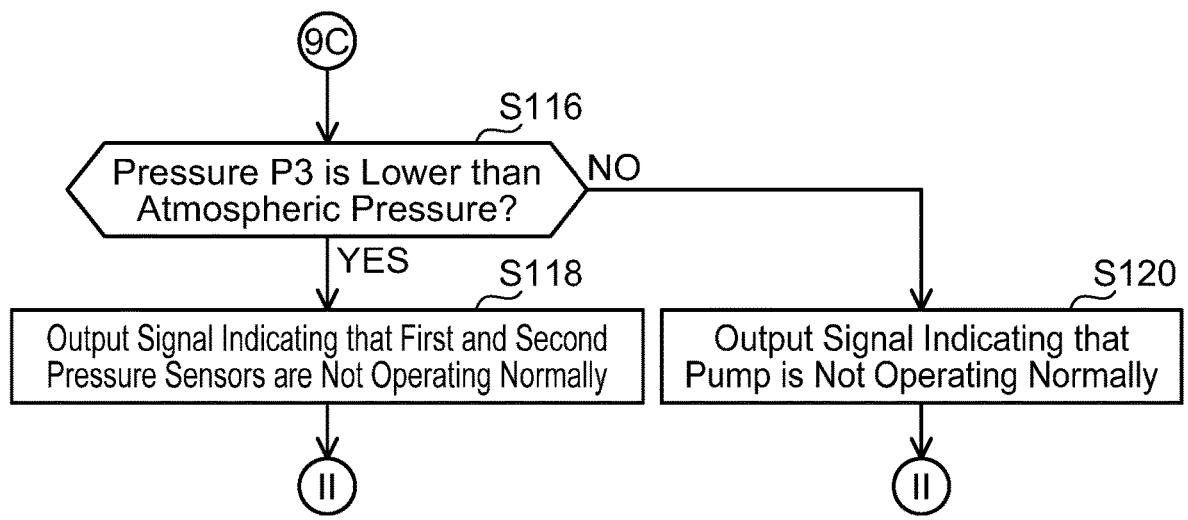
FIG. 14 shows a flowchart continuing from FIG. 13.

In a case where the pressure P2 is not lower than the atmospheric pressure in S108 (NO in S108), as shown in FIG. 14, the controller 102 determines in S116 whether or not the pressure P3 is lower than the atmospheric pressure, similarly to S96.

In a case where the pressure P3 is lower than the atmospheric pressure (YES in S116), the controller 102 determines in S118 that the first pressure sensor 42 and the second pressure sensor 44 are not operating normally, outputs a signal indicating this determination result to the display device of the vehicle, and terminates the normality determining process. At this occasion, the display device displays information indicating that the first pressure sensor 42 and the second pressure sensor 44 are not operating normally.

On the other hand, in a case where the pressure P3 is lower than the atmospheric pressure (NO in S116), the controller 102 determines in S120 that the pump 48 is not operating normally, outputs a signal indicating this determination result to the display device of the vehicle, and terminates the normality determining process. At this occasion, the display device displays the information indicating that the pump 48 is not operating normally.

Figure 15:
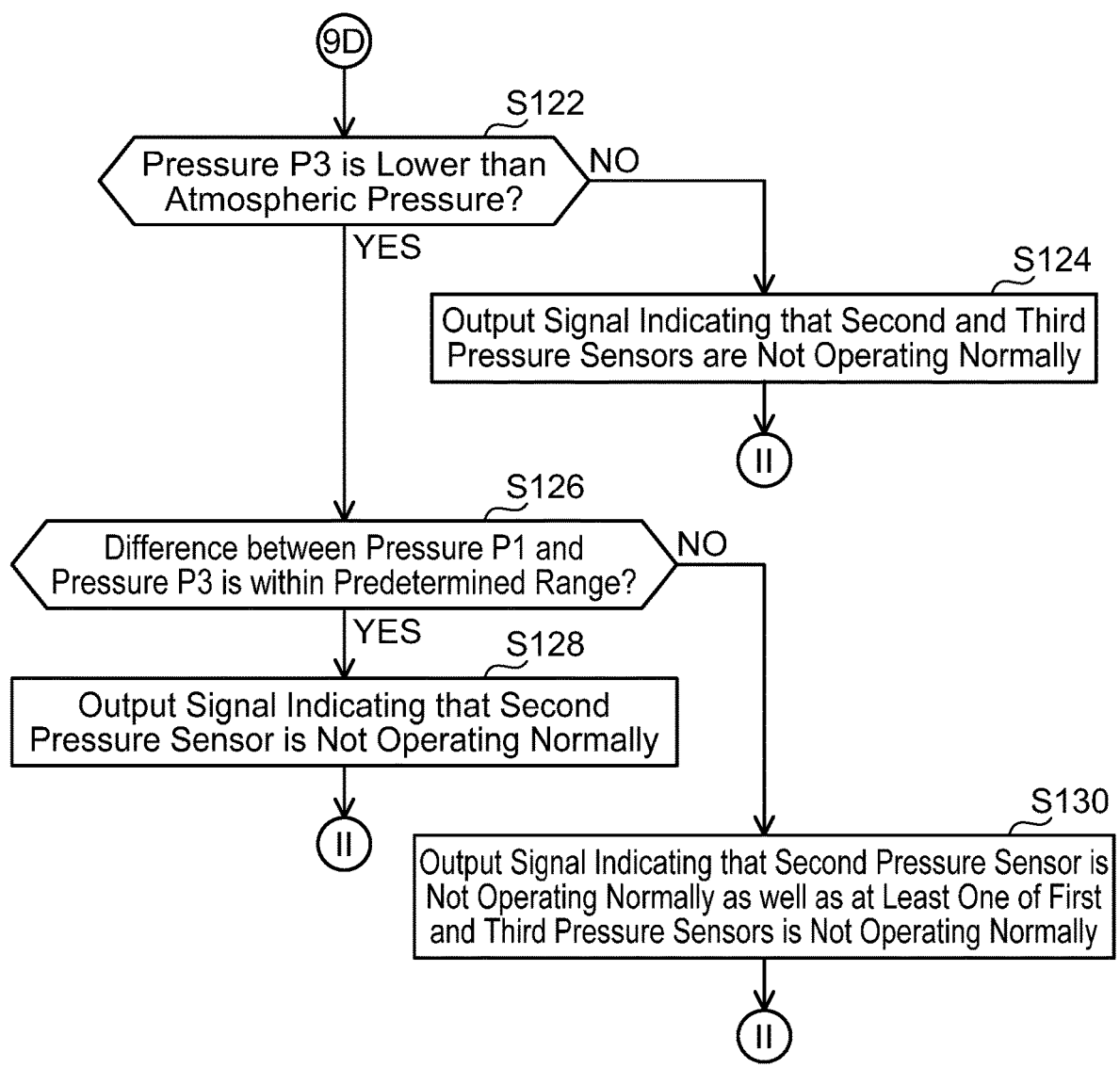
FIG. 15 shows a flowchart continuing from FIG. 12.

In a case where the pressure P2 is not lower than the atmospheric pressure in S94 of FIG. 12 (NO in S94), as shown in FIG. 15, the controller 102 determines in S122 whether or not the pressure P3 is lower than the atmospheric pressure, similarly to S96.

In a case where the pressure P3 is lower than the atmospheric pressure (YES in S122), the controller 102 determines in S126 whether or not the difference between the pressure P1 and the pressure P3 is within the predetermined range, similarly to S100. In the case where the difference between the pressure P1 and the pressure P3 is within the predetermined range (YES in S126), the controller 102 determines in S128 that the second pressure sensor 44 is not operating normally, outputs a signal indicating this determination result to the display device of the vehicle, and terminates the normality determining process. At this occasion, the display device displays information indicating that the second pressure sensor 44 is not operating normally.

On the other hand, in a case where the difference between the pressure P1 and the pressure P3 is not within the predetermined range (NO in S126), the controller 102 determines in S130 that the second pressure sensor 44 is not operating normally and at least one of the first pressure sensor 42 and the third pressure sensor 46 is not operating normally, outputs a signal indicating this determination result to the display device of the vehicle, and terminates the normality determining process. At this occasion, the display device displays information indicating that the second pressure sensor 44 is not operating normally and at least one of the first pressure sensor 42 and the third pressure sensor 46 is not operating normally.

In S122, in a case where the pressure P3 is not lower than the atmospheric pressure (NO in S122), the controller 102 determines in S124 that the second pressure sensor 44 and the third pressure sensor 46 are not operating normally, outputs a signal indicating this determination result to the display device of the vehicle, and terminates the normality determining process. At this occasion, the display device displays the information indicating that the second pressure sensor 44 and the third pressure sensor 46 are not operating normally.

According to this configuration, the driver can acknowledge that the pressure sensor(s) displayed on the display device is not operating normally.

In the evaporated fuel processing device 20, the pressure in the communicating space 15 can be reduced by the pump 248. Due to this, the determination that the evaporated fuel processing device 20 is incapable of operating normally can be made without using the negative pressure generated by the engine 2 being driven.

Further, similarly to the first embodiment, for each of the first to third pressure sensors 42, 44, 46, the determination as to whether the pressure sensor is operating normally or not can be made by using the respective detection results of the first to third pressure sensors 42, 44, 46. Further, for each of the first to third pressure sensors 42, 44, 46, the determination as to whether the pressure sensor is operating normally or not can be made by using the respective detection results of the first to third pressure sensors 42, 44, 46 in the first state and in the second state.

Third Embodiment

Figure 16:
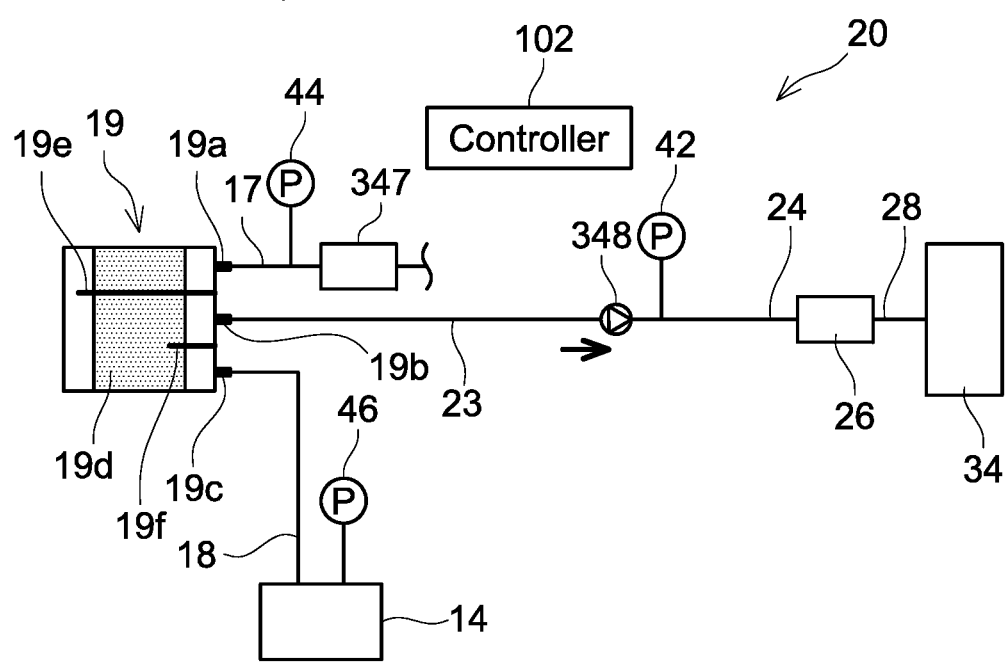
FIG. 16 shows an overview of an evaporated fuel processing device according to a third embodiment.

Differences from the first embodiment will be described. As shown in FIG. 16, an evaporated fuel processing device 20 according to the third embodiment includes a pump 348 instead of the pump 48, as compared with the evaporated fuel processing device 20 according to the first embodiment. The pump 348 is disposed on the purge passage 24. The pump 348 is disposed between the first pressure sensor 42 and the canister 19. The pump 348 is controlled by the controller 102 and is configured to pump gas from the canister 19 side to a control valve 26 side.

The evaporated fuel processing device 20 further includes an open air valve 347. The open air valve 347 is disposed on the open air passage 17. The open air valve 347 is disposed on the open air side than the second pressure sensor 44. The open air valve 347 is switched between an open state and a closed state by the controller 102. The open state is an open air communicating state in which the canister 19 is communicated with the open air through the open air passage 17, and the closed state is an open air non-communicating state in which the canister 19 is not communicated with the open air by the open air passage 17 being closed.

The controller 102 executes a process of detecting that the first to third pressure sensors 42, 44, 46 and the pump 48 are not operating normally. This process includes a pressure detecting process shown in FIG. 17 and the normality determining process shown in FIGS. 12 to 15.

Figures 17, 18:
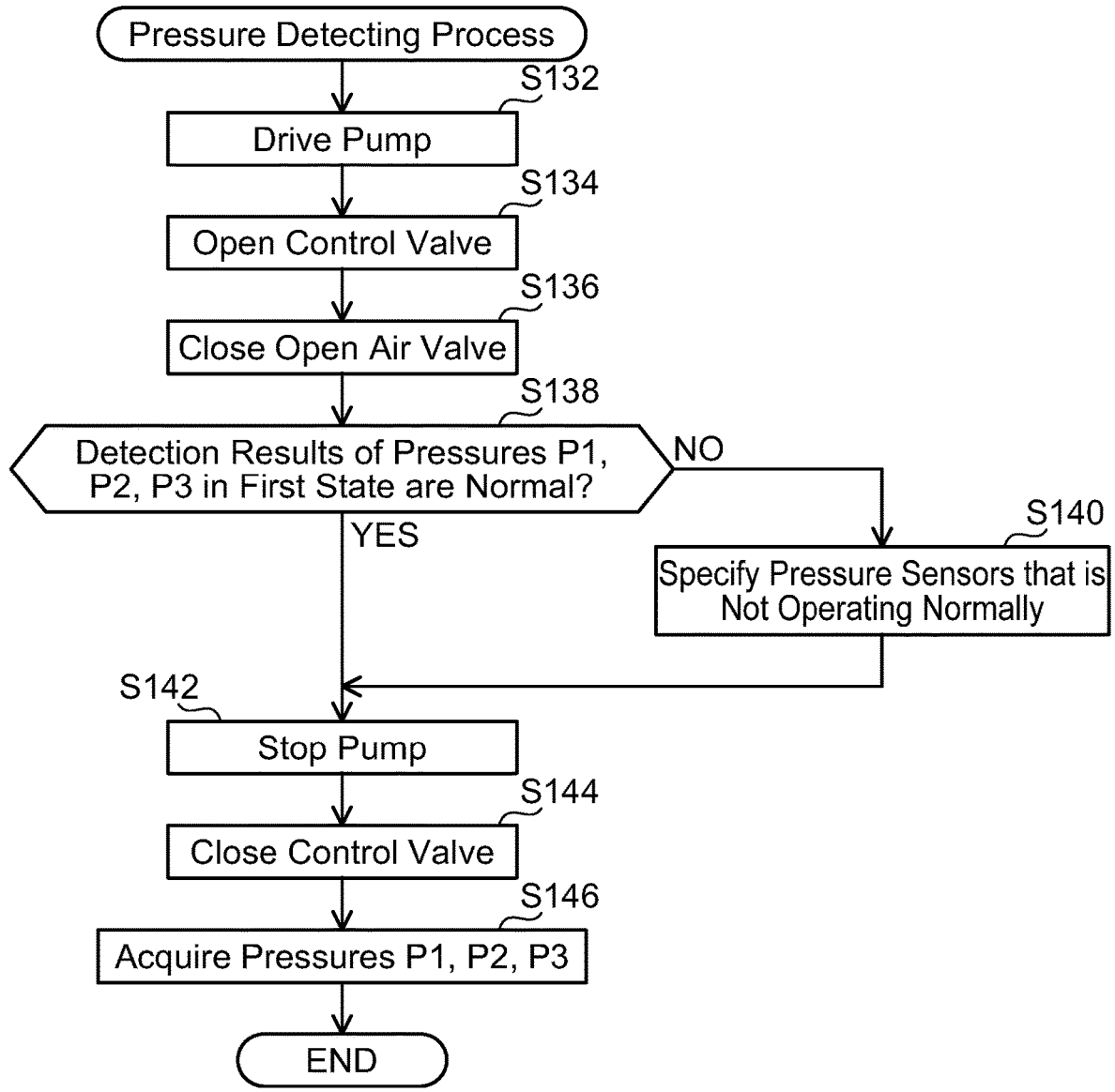
FIG. 17 shows a flowchart of a pressure detecting process according to the third embodiment.
FIG. 18 shows a table for explaining a first state and a second state according to the third embodiment.

The pressure detecting process is executed while the vehicle is stopped. While the vehicle is stopped, the control valve 26 is in the closed state, the open air valve 347 is in the open air communicating state, and the pump 348 is stopped. In S132, the controller 102 drives the pump 348. Then, in S134, the controller 102 opens the control valve 26. Due to this, the control valve 26 switches from the closed state to the open state. Then, in S136, the controller 102 closes the open air valve 347. As a result, a first state shown in FIG. 18 is achieved. In the case where the first to third pressure sensors 42, 44, 46 are operating normally, the atmospheric pressure is detected in the first pressure sensor 42, and negative pressures are detected in the second pressure sensor 44 and the third pressure sensor 46 in the first state. FIG. 18 shows that the negative pressures in the second pressure sensor 44 and the third pressure sensor 46 are "large" (that is, these pressures are low), which means that these pressures are large as compared to negative pressures in a second state to be described later.

In S138, the controller 102 determines whether or not each of the detection results of the first to third pressure sensors 42, 44, 46 is normal or not. Specifically, the controller 102 determines whether or not the pressure P1 is equal to the atmospheric pressure. Further, the controller 102 determines whether or not the pressures P2, P3 are lower than the atmospheric pressure (that is, they are the negative pressures). In a case where the pressure P1 is not equal to the atmospheric pressure (NO in S138), the controller 102 specifies the first pressure sensor 42 from among the first to third pressure sensors 42, 44, 46 in S140. Further, in a case where the pressure P2 is not lower than the atmospheric pressure (NO in S138), the controller 102 specifies the second pressure sensor 44 in S140. Further, in a case where the pressure P3 is not lower than the atmospheric pressure (NO in S138), the controller 102 specifies the third pressure sensor 46 in S140.

In a case where the pressure P1 is equal to the atmospheric pressure and both the pressures P2, P3 are lower than the atmospheric pressure (YES in S138), S140 is skipped and the process is proceeded to S142.

In S142, the controller 102 stops the pump 348. Then, in S144, the controller 102 switches the control valve 26 from being open to being closed. Due to this, the control valve 26 switches from the open state to the closed state. As a result, communication between the communicating space 15 and the open air is cut off by the control valve 26 and the open air valve 347, and the second state shown in FIG. 18 is achieved. In the second state, the pressure is uniformized in the communicating space 15, and the negative pressures on the canister 19 side than the pump 348 thereby become small. Next, in S146, the controller 102 acquires the pressures P1, P2, P3 which respectively are the detection results of the first to third pressure sensors 42, 44, 46, and terminates the pressure detecting process.

Next, the normality determining process shown in FIGS. 12 to 15 is executed subsequent to the pressure detecting process. In the normality determining process, the controller 102 outputs information indicating that the pressure sensor(s) specified in S140 of FIG. 17 is not operating normally in S102, S104, S106, S112, S114, S118, S120, S124, S128, and S130.

In this embodiment as well, the effects similar to those of the first embodiment can be achieved.

Fourth Embodiment

Differences from the third embodiment will be described. In the fourth embodiment, the pump 348 is controlled by the ECU 100, and is further configured to pump gas from the control valve 26 side to the canister 19 side in addition to pumping the gas from the canister 19 side to the control valve 26 side.

The controller 102 executes a process of detecting that the first to third pressure sensors 42, 44, 46 and the pump 48 are not operating normally. This process includes a pressure detecting process shown in FIG. 19 and the normality determining process shown in FIGS. 5 to 8.

In S152, the controller 102 drives the pump 348 to pump the gas from the control valve 26 side to the canister 19 side. Then, the controller 102 executes processes of S154 to S158, similarly to the processes of S134 to S138. In S156, a first state shown in FIG. 20 is achieved. In the case where the first to third pressure sensors 42, 44, 46 are operating normally, the atmospheric pressure is detected in the first pressure sensor 42, and positive pressures that are larger than the atmospheric pressure are detected in the second pressure sensor 44 and the third pressure sensor 46 in the first state. The positive pressures in the second pressure sensor 44 and the third pressure sensor 46 are indicated as "large", which means that these pressures are large as compared to positive pressures in a second state to be described later.

In S158, the controller 102 determines whether or not the pressure P1 is equal to the atmospheric pressure. Further, the controller 102 determines whether or not the pressures P2, P3 are higher than the atmospheric pressure (that is, they are the positive pressures). In a case where the pressure P1 is not equal to the atmospheric pressure (NO in S158), the controller 102 specifies the first pressure sensor 42 in S160. Further, in a case where the pressure P2 is not higher than the atmospheric pressure (NO in S138), the controller 102 specifies the second pressure sensor 44 in S160. Further, in a case where the pressure P3 is not higher than the atmospheric pressure (NO in S158), the controller 102 specifies the third pressure sensor 46 in S160.

In a case where the pressure P1 is equal to the atmospheric pressure and both the pressures P2, P3 are higher than the atmospheric pressure (YES in S158), S160 is skipped and the process is proceeded to S162.

Next, the controller 102 executes processes of S162 to S166 similarly to the processes of S142 to S146, and terminates the pressure detecting process. In S164, the second state shown in FIG. 20 is achieved. In the second state, the pressure is uniformized in the communicating space 15, and the positive pressures on the canister 19 side than the pump 348 thereby become small.

Next, the normality determining process shown in FIGS. 5 to 8 is executed subsequent to the pressure detecting process. In the normality determining process, the controller 102 outputs information indicating that the pressure sensor (s) specified in S160 of FIG. 19 is not operating normally in S32, S34, S36, S42, S44, S48, S50, S54, S58, and S60.

In this embodiment as well, the effects similar to those of the third embodiment can be achieved.

Fifth Embodiment

Figure 21:
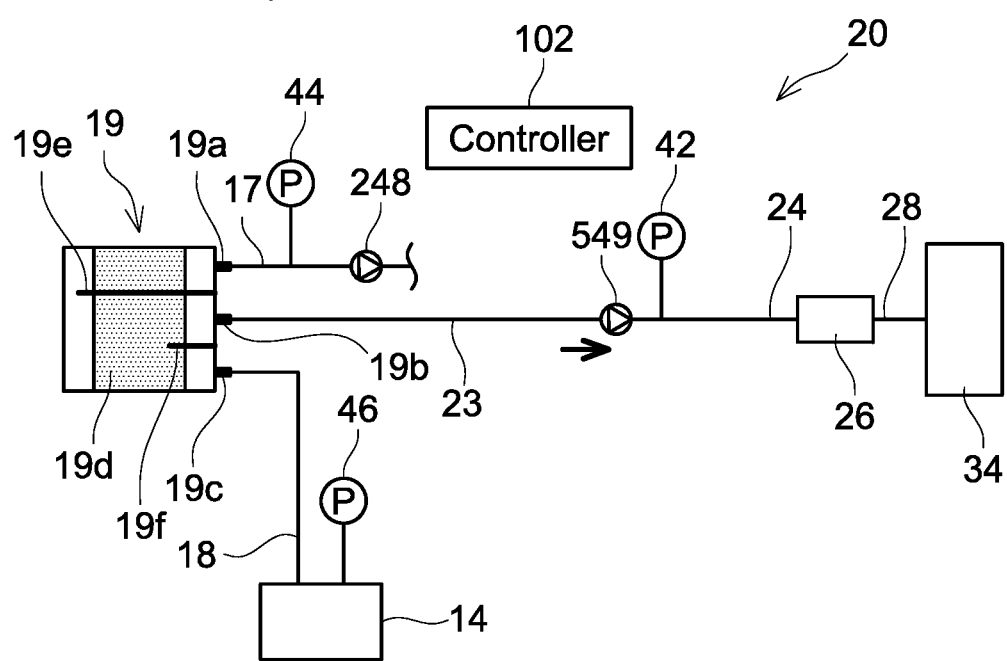
FIG. 21 shows an overview of an evaporated fuel processing device according to a fifth embodiment.

Differences from the second embodiment will be described. As shown in FIG. 21, an evaporated fuel processing device 20 according to the fifth embodiment includes a pump 549 in addition to the pump 248. The pump 549 is disposed between the first pressure sensor 42 and the canister 19. The pump 549 is controlled by the ECU 100 and is configured to pump gas from the canister 19 side to the control valve 26 side. The pump 549 is used to pump the purge gas toward the control valve 26 in the purge process, however, it is not used in the pressure detecting process and the normality determining process.

Sixth Embodiment

Figure 22:
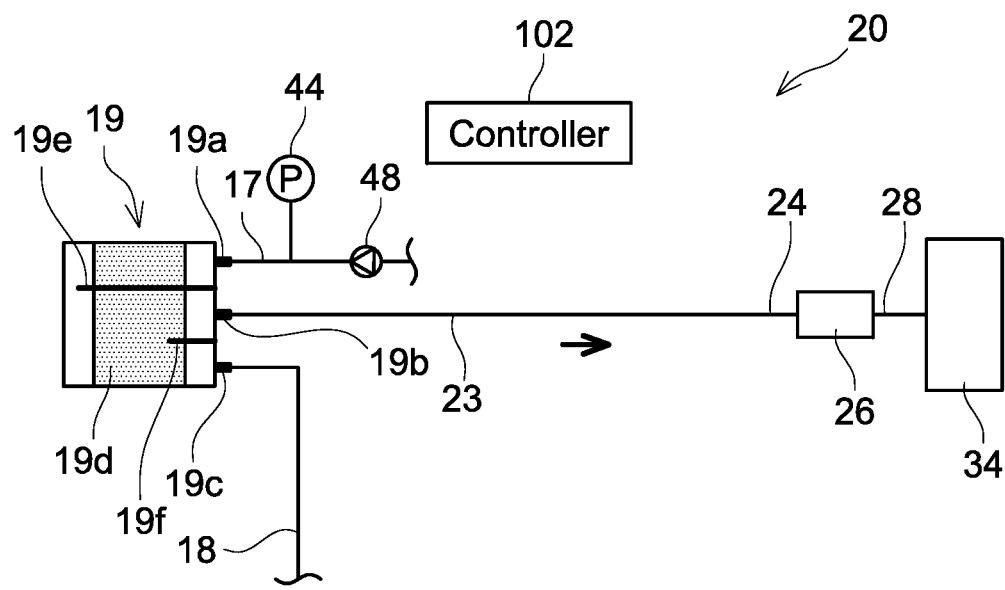
FIG. 22 shows an overview of an evaporated fuel processing device according to a sixth embodiment.

Differences from the first embodiment will be described. As shown in FIG. 22, an evaporated fuel processing device 20 according to the sixth embodiment includes the second pressure sensor 44 but does not include the first pressure sensor 42 nor the third pressure sensor 46.

Figure 23:
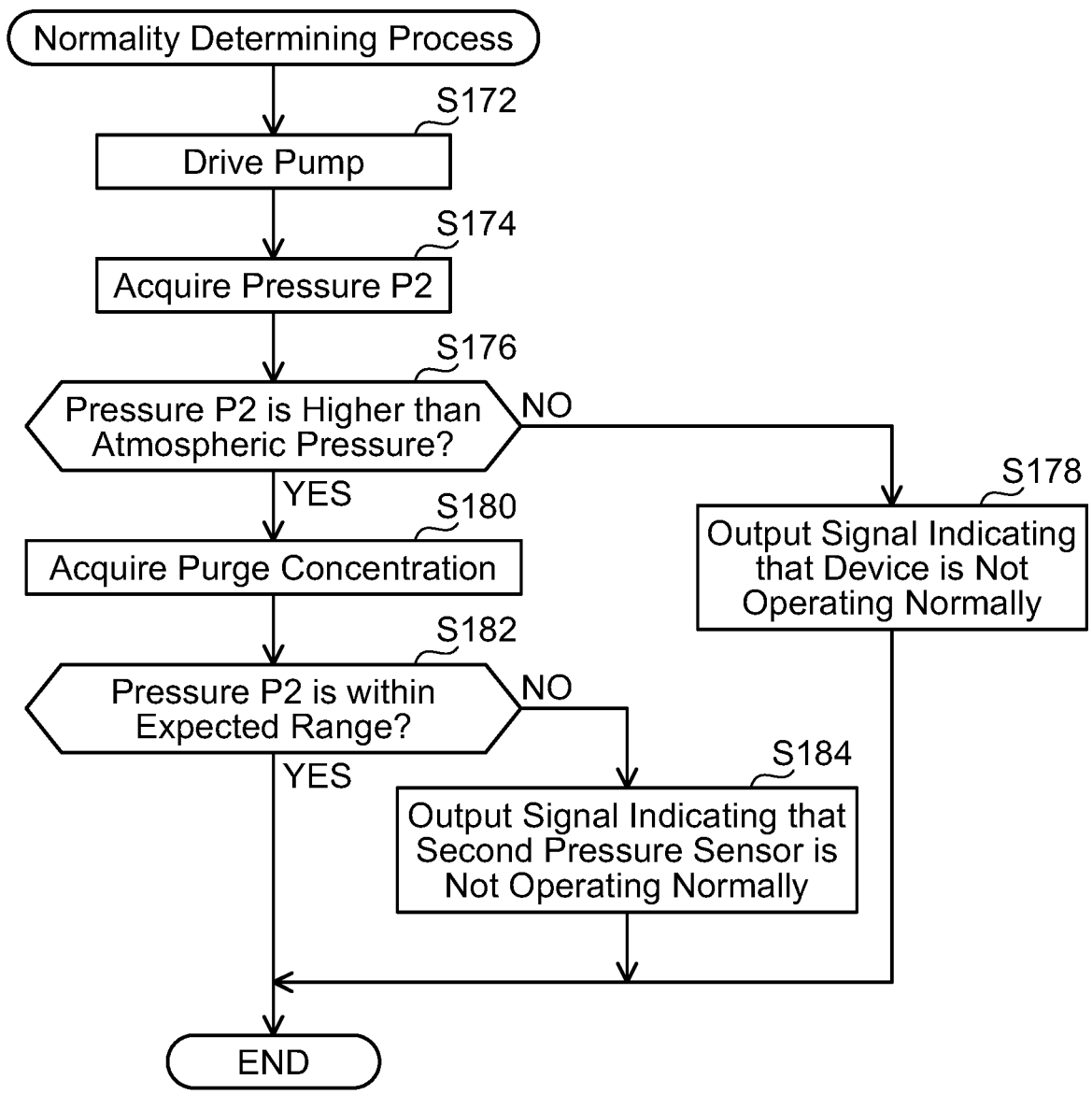
FIG. 23 shows a flowchart of a normality determining process according to the sixth embodiment.

The controller 102 executes a normality determining process shown in FIG. 23. The pressure detecting process as shown in FIG. 3 is not executed. The normality determining process is executed while the vehicle is stopped. While the vehicle is stopped, the control valve 26 is in the closed state and the pump 48 is stopped. In S172, the controller 102 drives the pump 48. Due to this, the communicating space 15 comes to have a positive pressure. Then, in S174, the controller 102 acquires the pressure P2 which is the detection result of the second pressure sensor 44. Since the communicating space 15 is closed by the control valve 26, the pressure therein is maintained at the positive pressure by the pump 48 being driven.

In S176, the controller 102 determines whether or not the pressure P2 acquired in S174 is higher than the atmospheric pressure, that is, it is the positive pressure. In a case where the pressure P2 is not higher than the atmospheric pressure (NO in S176), the controller 102 determines in S178 that the evaporated fuel processing device 20 is not operating normally, outputs a signal indicating this detection result to the display device, and terminates the normality determining process. In a situation where the evaporated fuel processing device 20 is not operating normally, at least one of the following situations is highly likely occurring: a situation in which the second pressure sensor 44 is not detecting the pressure normally, a situation in which the pump 48 is not pumping the gas normally, a situation in which the control valve 26 is not maintaining the closed state normally, and a situation in which a leak is occurring in the communicating space 15 at a position other than the control valve 26, for example.

When the display device receives the signal indicating that the evaporated fuel processing device 20 is not operating normally, it displays information indicating that the evaporated fuel processing device 20 is not operating normally.

On the other hand, in a case where the pressure P2 is higher than the atmospheric pressure (YES in S176), the controller 102 acquires a purge concentration in S180. The ECU 100 estimates purge concentration by using an air-fuel ratio of the engine 2. Specifically, at a timing when the purge process is started, the purge concentration is estimated as 0%, and a fuel amount injected from the injector 4 is adjusted so that the air-fuel ratio becomes a reference air-fuel ratio (such as the ideal air-fuel ratio). In a case where the air-fuel ratio is rich during when the adjusted fuel amount is injected from the injector 4, the purge concentration is estimated as being 0+X %, and the fuel amount injected from the injector 4 is newly adjusted. After this, the purge concentration is added by X % increment until the air-fuel ratio approximates the reference air-fuel ratio, to adjust the injection fuel amount, and the estimated purge concentration is thereby specified.

Since densities differ between the air and the evaporated fuel, a density of the purge gas changes according to the purge concentration. Pressure increase by the pump 48 becomes larger when the purge gas density is higher. The controller 102 stores in advance a data map indicating a correlating relationship between the purge concentration and the pressure in the communicating space 15. This data map is specified in advance by experiments, and is stored in the controller 102.

In S182, the controller 102 determines whether or not the pressure P2 acquired in S174 is within an expected range. Specifically, the controller 102 firstly specifies the pressure in the communicating space 15 corresponding to the purge concentration acquired in S180 from the data map. Then, the controller 102 determines whether or not the pressure P2 acquired in S174 is included in the expected range which is based on the pressure specified from the data map (for example, a range within ±2 kPa from the pressure specified from the data map). In a case where the pressure P2 is within the expected range (YES in S182), the controller 102 terminates the normality determining process. In this case, the evaporated fuel processing device 20 can be determined as operating normally.

On the other hand, in a case where the pressure P2 is not within the expected range (NO in S182), the controller 102 determines in S184 that the second pressure sensor 44 is not operating normally, outputs a signal indicating this detection result to the display device, and terminates the normality determining process. When the display device receives the signal indicating that the second pressure sensor 44 is not operating normally, it displays information indicating that the second pressure sensor 44 is not operating normally.

In this embodiment as well, in the evaporated fuel processing device 20, the pressure in the communicating space 15 can be increased by the pump 48. Due to this, the determination that the evaporated fuel processing device 20 is incapable of operating normally can be made without using the negative pressure generated by the engine 2 being driven.

Seventh Embodiment

Differences from the sixth embodiment will be described. As compared to the sixth embodiment, the seventh embodiment differs in its normality determining process. The controller 102 executes the normality determining process after the vehicle is activated (that is, after an ignition switch is turned on) and before the purge condition is satisfied. Since the timing is before the purge condition is satisfied, the pump 48 is stopped and the control valve 26 is in the closed state.

Figure 24:
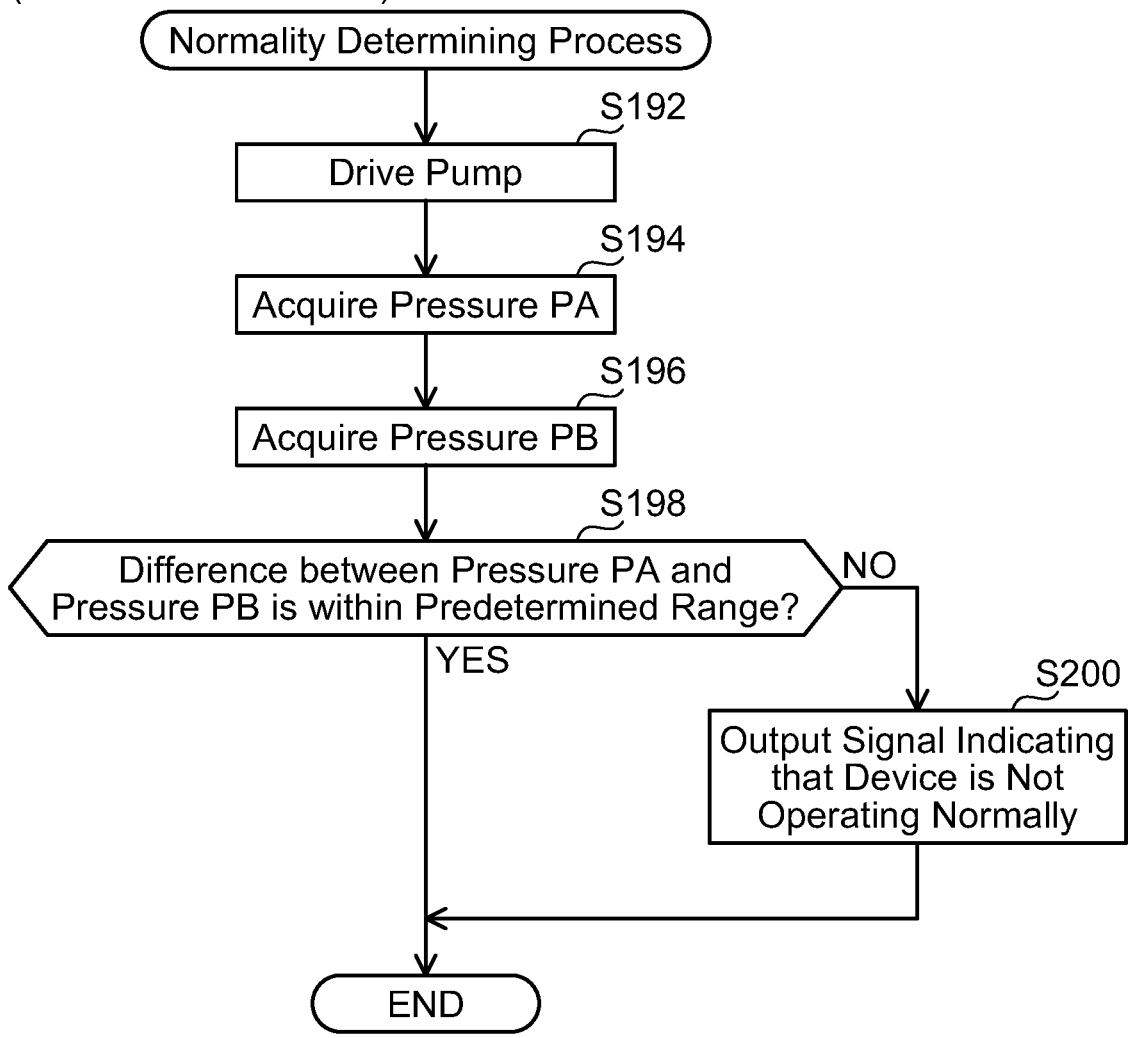
FIG. 24 shows a flowchart of a normality determining process according to a seventh embodiment.

As shown in FIG. 24, in the normality determining process, the controller 102 drives the pump 48 in S192. Then, in S194, the controller 102 acquires a pressure PA which is the detection result of the second pressure sensor 44 immediately after starting to drive the pump 48. Then, in S196, the controller 102 acquires a pressure PB which is the detection result of the second pressure sensor 44 after a predetermined time period (such as 5 minutes) has elapsed since the controller 102 started to drive the pump 48.

Figure 25:
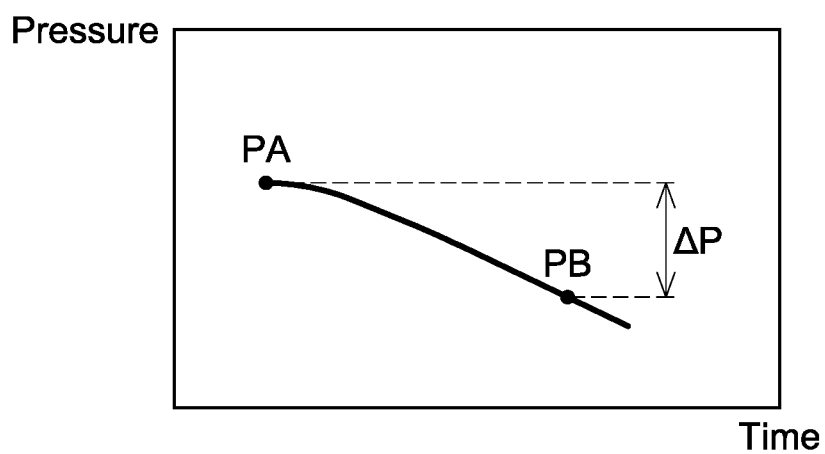
FIG. 25 shows a graph indicating a change in a pressure relative to time according to the seventh embodiment.

When the pump 48 is continuously driven over the predetermined time period, a motor of the pump 48 is heated and a temperature of the gas in the pump 48 rises. As a result, the density of the gas in the pump 48 decreases, and the pressure thereof thereby decreases. Therefore, as shown in FIG. 25, the pressure PB detected in S196 is supposed to be lower than the pressure PA detected in S194.

In subsequent S198, the controller 102 determines whether or not a pressure difference $\Delta P$ between the pressure PA and the pressure PB is within a predetermined range stored in the controller 102 in advance. The predetermined range is a range of the pressure difference $\Delta P$ that is obtained in advance by experiments when the evaporated fuel processing device 20 is operating normally (that is, a range including a detection error). In a case where the pressure difference $\Delta P$ is not within the predetermined range (NO in S198), the controller 102 determines in S200 that the evaporated fuel processing device 20 is not operating normally, similarly to S178, outputs a signal indicating this detection result to the display device, and terminates the normality determining process.

On the other hand, in a case where the pressure difference $\Delta P$ is within the predetermined range (YES in S198), the controller 102 does not execute S200 and terminates the normality determining process.

In this embodiment as well, in the evaporated fuel processing device 20, the pressure in the communicating space 15 can be increased by the pump 48. Due to this, the determination that the evaporated fuel processing device 20 is incapable of operating normally can be made without using the negative pressure generated by the engine 2 being driven.

Further, since the determination on whether or not the evaporated fuel processing device 20 is operating normally is made based on the difference between the pressure PA and the pressure PB, an influence on the determination caused by a variation in the detection result due to the change in the purge concertation (that is, the change in the density) can be reduced as compared to the case of using the detection result of the second pressure sensor 44 itself.

Eighth Embodiment

Differences from the sixth embodiment will be described. As compared to the sixth embodiment, the eighth embodiment differs in its normality determining process. The controller 102 executes the normality determining process after the vehicle is activated (that is, after the ignition switch is turned on) and before the purge condition is satisfied. Since the timing is before the purge condition is satisfied, the pump 48 is stopped and the control valve 26 is in the closed state.

Figure 26:
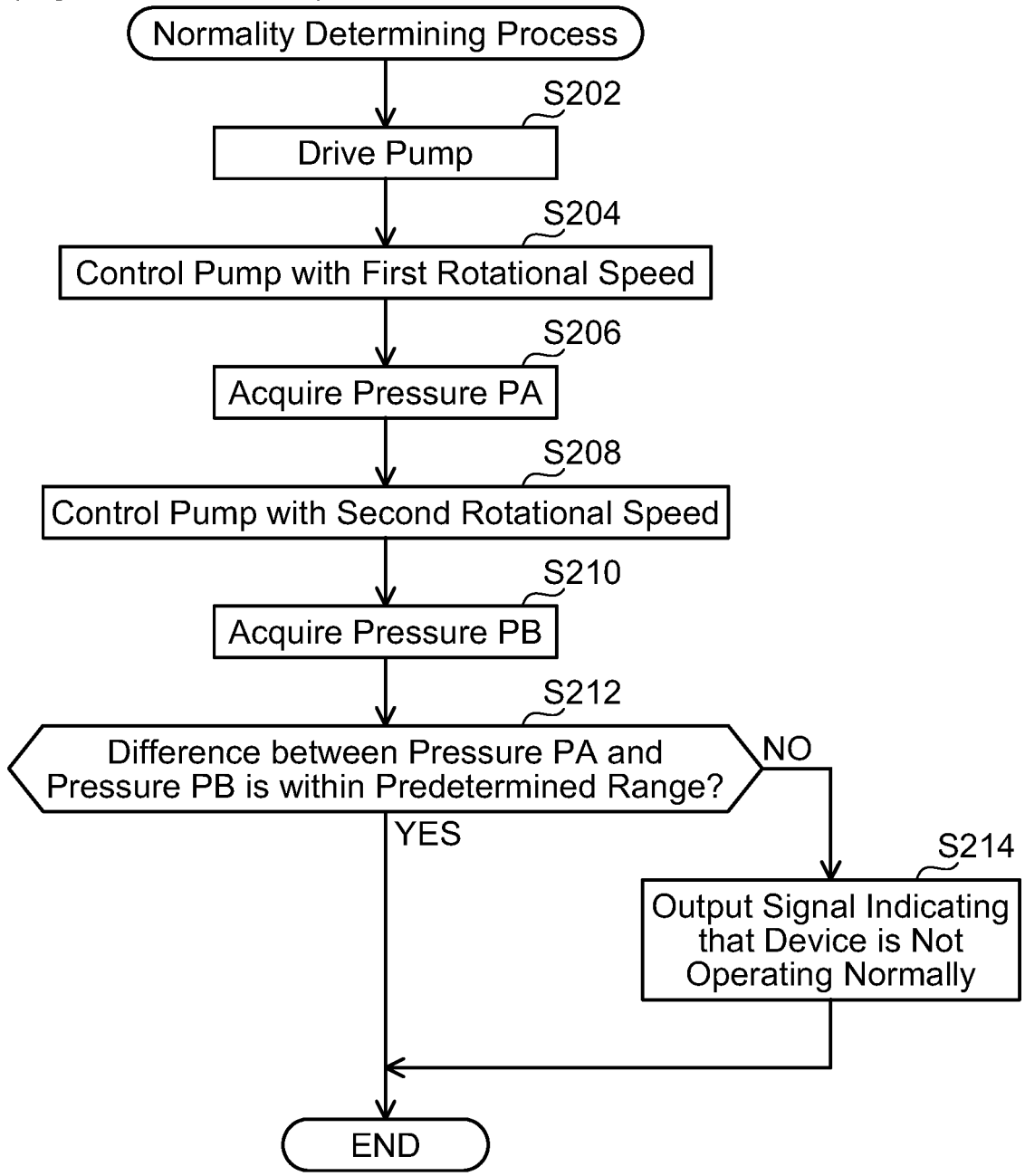
FIG. 26 shows a flowchart of a normality determining process according to an eighth embodiment.

As shown in FIG. 26, in the normality determining process, the controller 102 drives the pump 48 in S202. Then, after the rotational speed of the pump 48 has become stable, the controller 102 controls the rotational speed of the pump 48 to be a preset first rotational speed (such as 8000 rpm) in S204. Then, in S206, the controller 102 acquires the pressure PA which is the detection result of the second pressure sensor 44. Next, in S208, the controller 102 controls the rotational speed of the pump 48 to be a preset second rotational speed (such as 12000 rpm). The first rotational speed and the second rotational speed simply need to be different from each other, and it does not matter which of the speeds is higher than the other.

Figure 27:
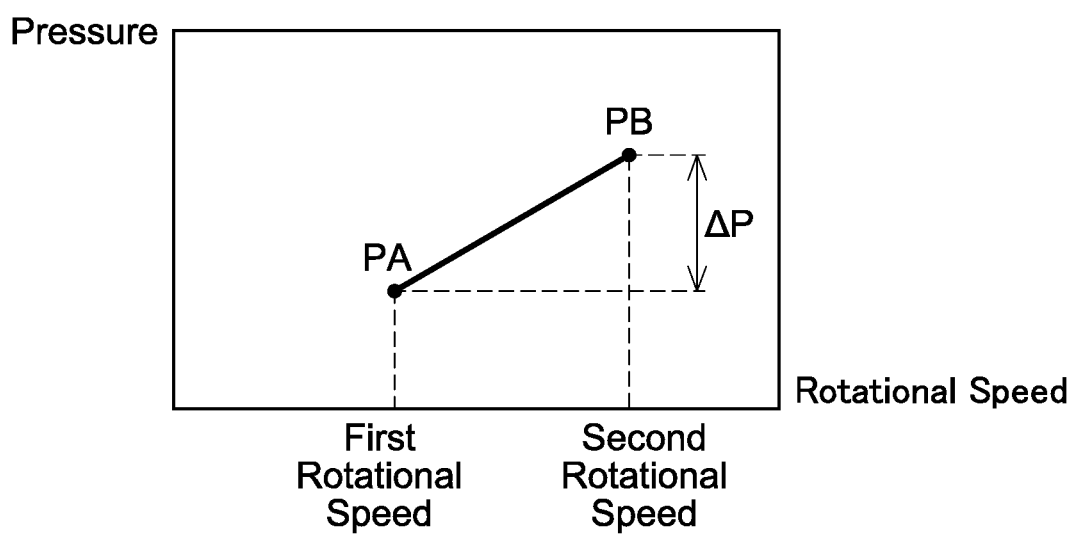
FIG. 27 shows a graph indicating a change in a pressure relative to a rotational speed of a pump according to the eighth embodiment.
Figure 28:
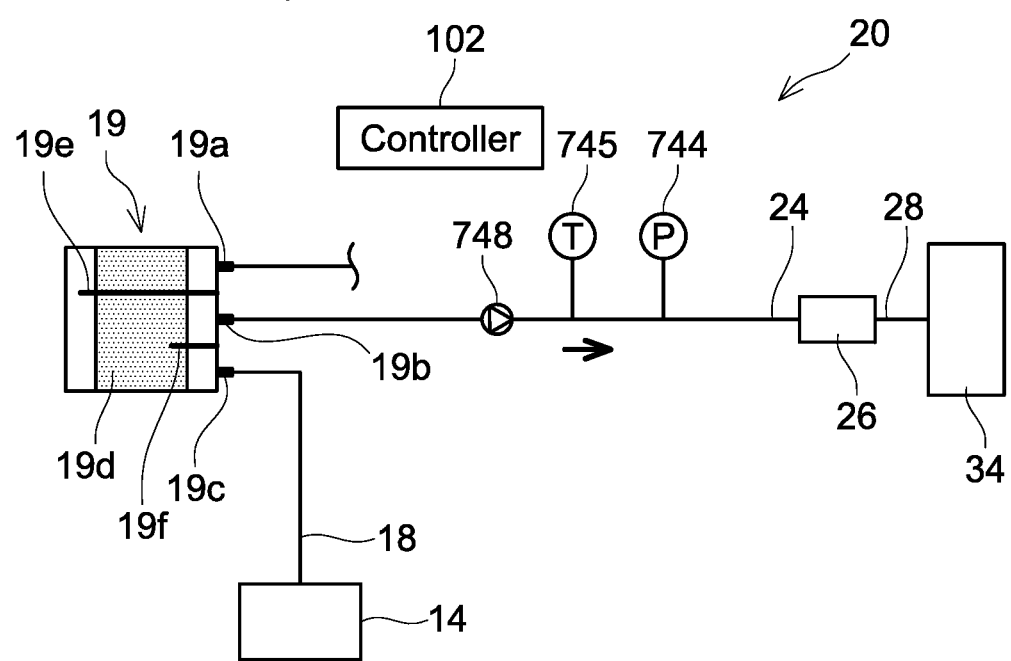
FIG. 28 shows an overview of an evaporated fuel processing device according to a ninth embodiment.

Next, in S210, the controller 102 acquires the pressure PB which is the detection result of the second pressure sensor 44. As shown in FIG. 27, in the case where the second rotational speed is higher than the first rotational speed, the pressure in the communicating space 15 with the second rotational speed is higher than the pressure in the communicating space 15 with the first rotational speed.

In subsequent S212, the controller 102 determines whether or not the pressure difference $\Delta P$ between the pressure PA and the pressure PB is within a predetermined range stored in the controller 102 in advance. The predetermined range is a range of the pressure difference $\Delta P$ that is obtained in advance by experiments when the evaporated fuel processing device 20 is operating normally (that is, a range including a detection error). In a case where the pressure difference $\Delta P$ is not within the predetermined range (NO in S212), the controller 102 determines in S214 that the evaporated fuel processing device 20 is not operating normally, similarly to S200, outputs a signal indicating this detection result to the display device, and terminates the normality determining process.

On the other hand, in a case where the pressure difference $\Delta P$ is within the predetermined range (YES in S212), the controller 102 does not execute S214 and terminates the normality determining process.

This embodiment can achieve similar effects as those of the seventh embodiment. Especially, according to this configuration, the determination that the evaporated fuel processing device 20 is not operating normally can be made by using the detection results in two states with different pressures in the communicating space 15 by changing the rotational speed of the pump 48.

Ninth Embodiment

Differences from the sixth embodiment will be described. In the ninth embodiment, an evaporated fuel processing device 20 includes a pump 748 instead of the pump 48. The pump 748 is disposed on the purge passage 24 between the control valve 26 and the canister 19. Further, the evaporated fuel processing device 20 incudes a pressure sensor 744 and a temperature sensor 745 that are disposed on the purge passage 24 between the control valve 26 and the pump 748. The pressure sensor 744 detects the pressure in the purge passage 24. The temperature sensor 745 detects a temperature of the gas in the purge passage 24.

Figure 30:
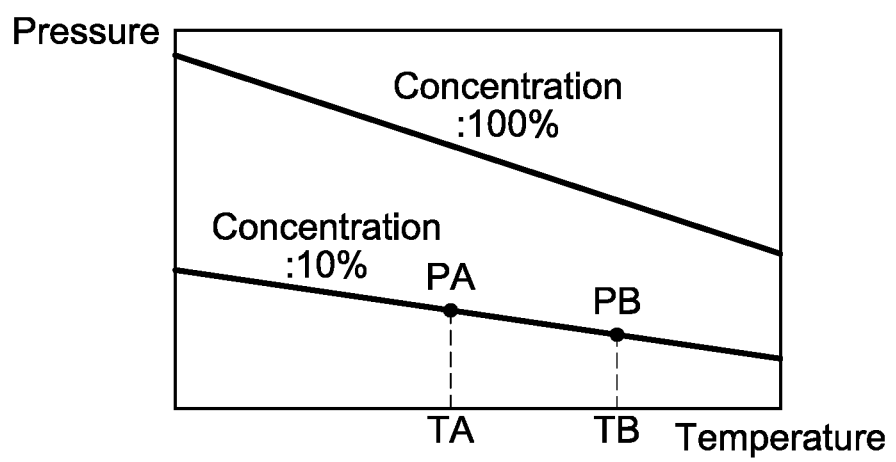
FIG. 30 shows a pressure-temperature data map according to the ninth embodiment.

Further, the controller 102 stores a pressure-temperature data map indicating a correlating relationship between the pressure in the purge passage 24 and a temperature in the pump 748, as shown in FIG. 30. When the temperature in the pump 748 rises, a density of gas in the pump 748 decreases and the pressure thereof thereby decreases. Further, when the purge concentration is low, the density of the gas decreases and the pressure thereof thereby decreases. The pressure-temperature data map includes characteristic data indicating the correlating relationship between the pressure and the temperature (hereinbelow termed "T-P characteristic") for plural purge concentrations within 0% to 100%. FIG. 30 shows the T-P characteristics for the purge concentrations of 10% and 100% as an example, however, the pressure-temperature data map actually includes the T-P characteristics for a larger number of purge concentrations.

The ninth embodiment executes a normality determining process that is different from the normality determining process according to the sixth embodiment. The controller 102 executes the normality determining process after the vehicle is activated (that is, after the ignition switch is turned on) and before the purge condition is satisfied. Since the timing is before the purge condition is satisfied, the pump 48 is stopped and the control valve 26 is in the closed state.

Figure 29:
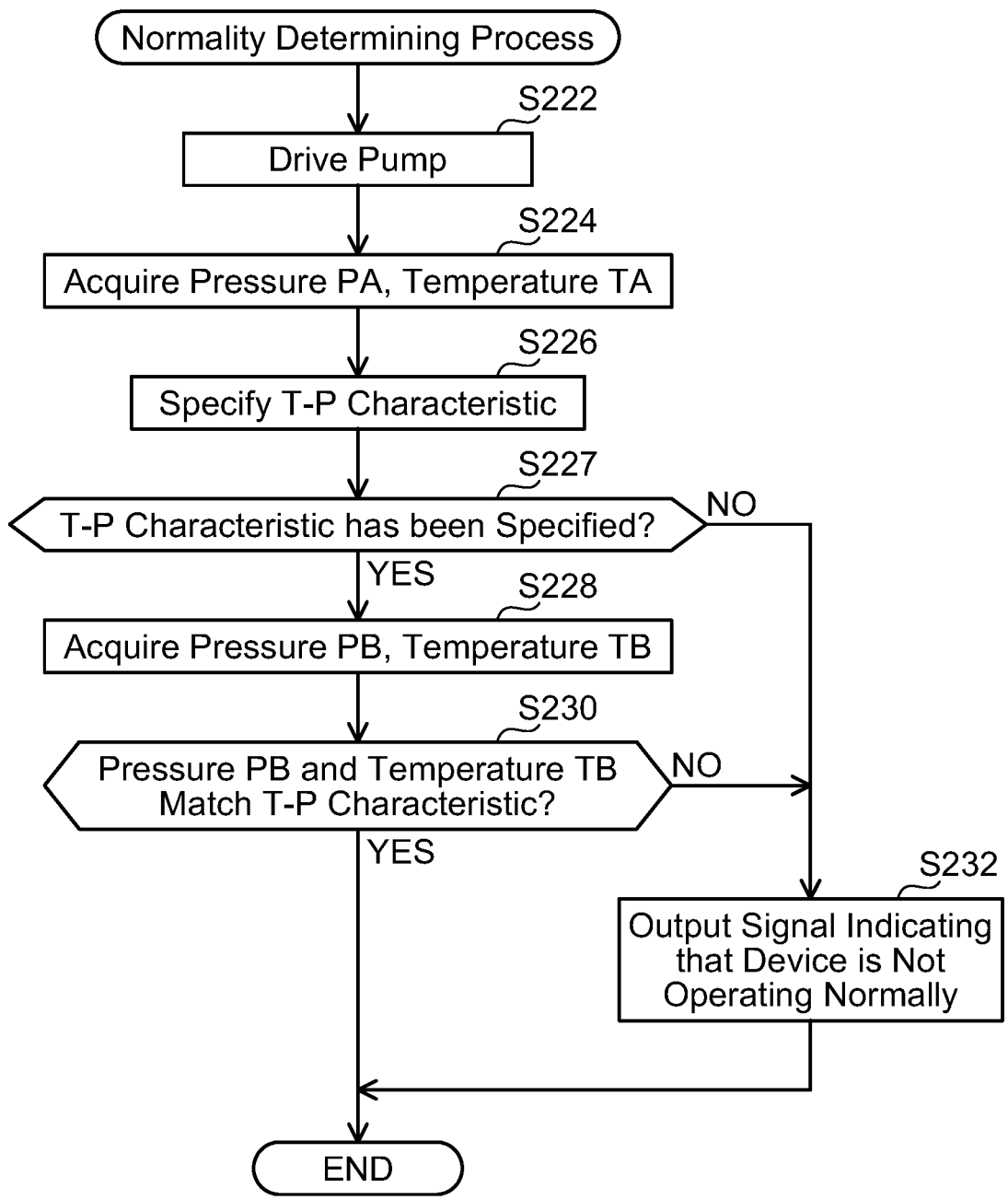
FIG. 29 shows a flowchart of a normality determining process according to the ninth embodiment.

As shown in FIG. 29, in the normality determining process, the controller 102 drives the pump 48 in S222. Then, in S224, the controller 102 acquires a pressure PA which is a detection result of the pressure sensor 744 and a temperature TA which is a detection result of the temperature sensor 745. Next, in S226, the controller 102 specifies one T-P characteristic from the pressure-temperature data map by using the pressure PA and the temperature TA acquired in S224. As shown in FIG. 30, if the pressure PA and the temperature TA match the T-P characteristic for the purge concentration 10%, for example, the controller 102 specifies the T-P characteristic for the purge concentration 10%.

However, in a case where one or more of the pressure sensor 744, the temperature sensor 745, the pump 748, and the control valve 26 are not operating normally, the pressure PA and the temperature TA acquired in S224 may not match any of the T-P characteristics, thus the T-P characteristic may not be specified. In S227, the controller 102 determines whether or not the T-P characteristic has been specified in S226. In a case where the T-P characteristic has been specified (YES in S227), the process is proceeded to S228. In a case where the T-P characteristic is not specified (NO in S227), the process is proceeded to S232.

In S228, the controller 102 acquires a pressure PB which is the detection result of the pressure sensor 744 and a temperature TB which is the detection result of the temperature sensor 745 after a predetermined time period (such as 5 minutes) has elapsed since the process of S226 was executed. When the pump 48 is continuously driven over the predetermined time period, the temperature of the gas in the pump 48 rises. As a result, the density of the gas in the pump 48 decreases, and the pressure thereof thereby decreases. Therefore, as shown in FIG. 30, the pressure in the communicating space 15 is lower at a timing of detection of S228 than at a timing of detection of S226. Further, the gas, of which temperature has been raised in the pump 748 during the predetermined time period, reaches the temperature sensor 745. Due to this, the temperature in the pump 748 after the temperature rise can be detected by using the temperature sensor 745.

In S230, the controller 102 determines whether or not the pressure PB and the temperature TB acquired in S228 match the T-P characteristic specified in S226. In a case where they do not match the T-P characteristic (NO in S230), the process is proceeded to S232. In a case where they match the T-P characteristic (YES in S230), the S232 is skiped and the normality determining process is terminated. In S232, the controller 102 determines that the evaporated fuel processing device 20 is not operating normally, similarly to S200, outputs a signal indicating this detection result to the display device, and terminates the normality determining process.

This embodiment can also achieve similar effects to those of the seventh embodiment. Further, the pressure change by the pump 748 varies according to the temperature of the gas in the pump 748. In this embodiment, the determination that the evaporated fuel processing device 20 is not operating normally can be made by taking into account the pressure change caused by the temperature change of the gas in the pump 748. The temperature sensor 745 may be disposed near the pump 748, may be disposed integrally with the pump 748, or may be disposed within the pump 748.

Tenth Embodiment

Differences from the ninth embodiment will be described. As compared to the ninth embodiment, the tenth embodiment differs in its normality determining process. The controller 102 executes the normality determining process periodically during when the purge process is executed. At a timing when the normality determining process is started, the control valve 26 is duty-controlled. Further, the pump 748 may be driven in some cases, and may be stopped in other cases.

Figure 31:
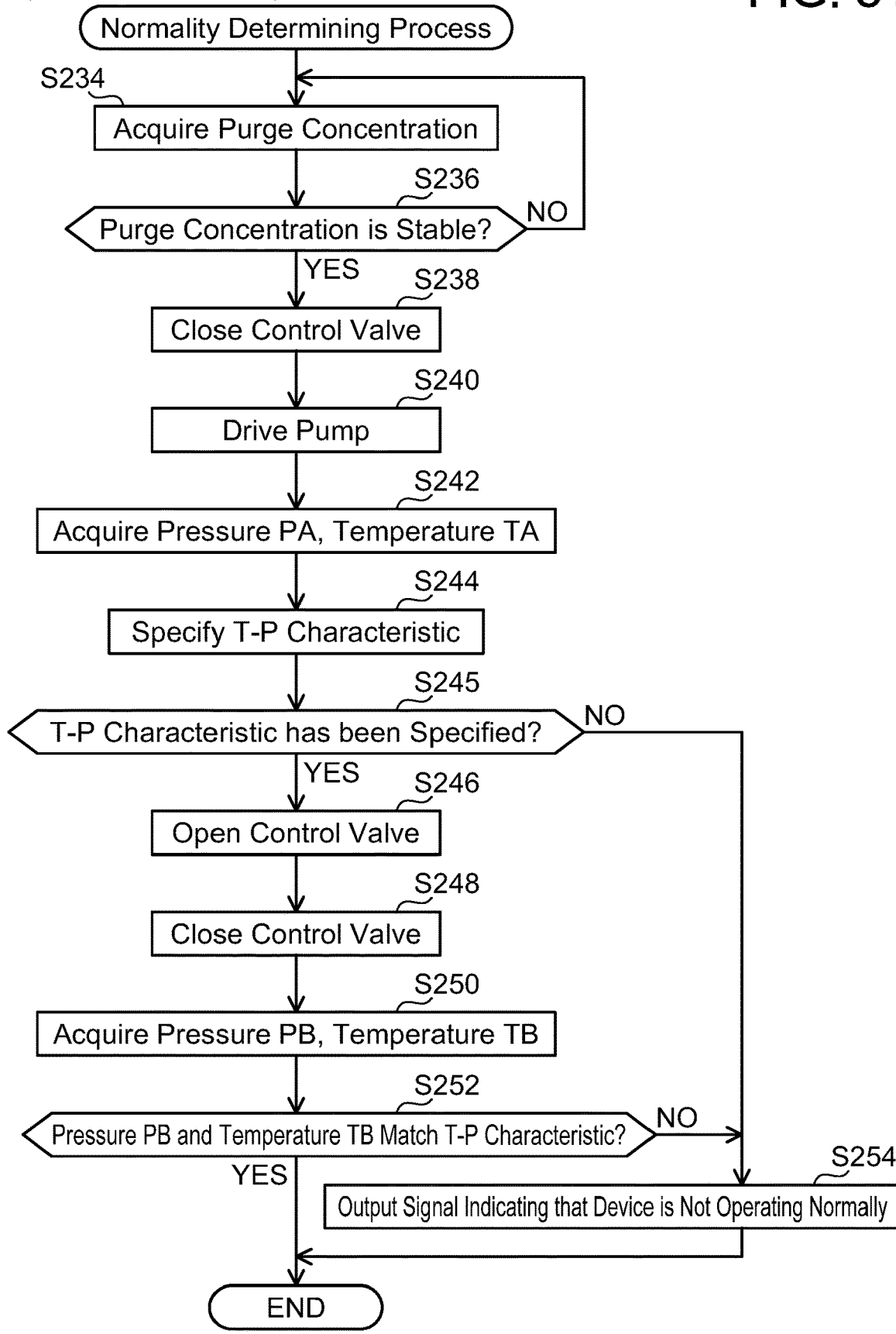
FIG. 31 shows a flowchart of a normality determining process according to a tenth embodiment.

As shown in FIG. 31, in the normality determining process, the controller 102 acquires the estimated purge concentration from the ECU 100 in S234, similarly to S180 of FIG. 23. Then, in S236, the controller 102 determines whether or not the purge concentration is stable. Specifically, the controller 102 determines that the purge concentration is stable in a case where there is no change among the purge concentrations acquired for plural times (such as 3 times) in S234 (for example, in a case where a difference among the purge concentrations is less than 1%). On the other hand, in a case where there is a change among the purge concentrations acquired for plural times in S234, the controller 102 determines that the purge concentration is not stable. In a case of determining that the purge concentration is stable (YES in S236) the process is proceeded to S238. In a case of determining that the purge concentration is not stable (YES in S236), the process is returned to S234. It is determined NO to S236 in a case where the purge concentrations are not acquired for plural times in S234, and the process is proceeded to S238.

In S238, the controller 102 closes the control valve 26. Then, in S240, the controller 102 drives the pump 748. If the pump 748 is already driven, S240 is skipped. Next, in S242, the controller 102 acquires the pressure PA which is the detection result of the pressure sensor 744 and the temperature TA which is the detection result of the temperature sensor 745. Then, in S244, similarly to S226, the controller 102 specifies one T-P characteristic from the pressure-temperature data map by using the pressure PA and the temperature TA acquired in S242.

Next, in S245, the controller 102 determines whether or not the T-P characteristic has been specified in S244. In a case where the T-P characteristic has been specified (YES in S245), the process is proceeded to S246. In a case where the T-P characteristic is not specified (NO in S245), the process is proceeded to S254.

In S246, the controller 102 switches the control valve 26 from the closed state to the open state by opening the control valve 26 after a predetermined time period (such as 5 minutes) has elapsed since the controller 102 closed the control valve 26 in S238. Then, in S248, the controller 102 switches the control valve 26 from the open state to the closed state by closing the control valve 26 after a certain time period has elapsed since the controller 102 opened the control valve 26. This certain time period is longer than a time period required for the gas in the pump 748 to reach the temperature sensor 745 after the control valve 26 was opened.

Next, in S250, the controller 102 acquires the pressure PB which is the detection result of the pressure sensor 744 and the temperature TB which is the detection result of the temperature sensor 745. Then, in S252, the controller 102 determines whether or not the pressure PB and the temperature TB acquired in S250 match the T-P characteristic specified in S244. In a case where they do not match the T-P characteristic (NO in S252), the process is proceeded to S254. In a case where they match the T-P characteristic (YES in S252), the S254 is skiped and the normality determining process is terminated. In S254, the controller 102 determines that the evaporated fuel processing device 20 is not operating normally, similarly to S200, outputs a signal indicating this detection result to the display device, and terminates the normality determining process.

This embodiment can achieve similar effects to those of the ninth embodiment. Further, since the determination on whether or not the evaporated fuel processing device 20 is operating normally is made after the purge concentration has become stable, an influence of a variation in the pressure caused by the change in the purge concertation can be suppressed.

While specific examples of the present invention have been described above in detail, these examples are merely illustrative and place no limitation on the scope of the patent claims. The technology described in the patent claims also encompasses various changes and modifications to the specific examples described above.

(1) The purge concentration may be detected, for example, by a purge concentration detector disposed on the purge passage 24.

(2) The controller 102 may be disposed separately from the ECU 100.

The technical elements explained in the present description or drawings provide technical utility either independently or through various combinations. The present invention is not limited to the combinations described at the time the claims are filed. Further, the purpose of the examples illustrated by the present description or drawings is to satisfy multiple objectives simultaneously, and satisfying any one of those objectives gives technical utility to the present invention.

The invention claimed is:

1. An evaporated fuel processing device comprising:
   a canister configured to communicate with a fuel tank though a tank passage, communicate with an intake passage of an engine through a purge passage, and communicate with open air through an open air passage;
   a control valve disposed on the purge passage and configured to switch between a closed state and an open state, the closed state being a state of closing the purge passage, and the open state being a state of opening the purge passage;
   a pump configured to change a pressure in a communicating space in a case where the control valve is in the closed state, the communicating space defined by the fuel tank, the tank passage, the canister, the open air passage, and the purge passage on a side closer to the canister relative to the control valve which communicate with one another;
   a pressure detector disposed on at least one of the fuel tank, the tank passage, the canister, the open air passage, and the purge passage on the side closer to the canister relative to the control valve; and
   a determining unit configured to determine that the evaporated fuel processing device is not operating normally by using a pressure detection result by the pressure detector in a state where the control valve is in the closed state and the pressure in the communicating space is changed by the pump, and determine that the evaporated fuel processing device is not operating normally by further using a pressure detection result by the pressure detector in a state where the communicating space communicates with the open air, the evaporated fuel processing device being not operating normally including that the pump does not normally change the pressure in the communicating space, and the pressure detector does not perform detection normally, wherein:
   the pressure detector comprises a first pressure sensor, a second pressure sensor and a third pressure sensor, wherein the first pressure sensor is disposed on the purge passage closer to the canister relative to the control valve the second pressure sensor is disposed on the open air passage, and the third pressure sensor is disposed on the fuel tank or the tank passage,
   the determining unit is configured to determine that;
      at least one of the first pressure sensor, the second pressure sensor and the third pressure sensor does not perform detection normally by using pressure detection results of the first pressure sensor, the second pressure sensor and the third pressure sensor in the state where the communicating space communicates with the open air,
      at least one of the first pressure sensor, the second pressure sensor and the third pressure sensor does not perform detection normally by using pressure detection results of the first pressure sensor, the second pressure sensor and the third pressure sensor in the state where the control valve is in the closed state and the pressure in the communicating space is changed by the pump,
      at least one of the first pressure sensor, the second pressure sensor and the third pressure sensor does not perform detection normally by using at least one of a difference between the pressure detection result of the first pressure sensor and the pressure detection result of the second pressure sensor in the state where the control valve is in the closed state and the pressure in the communicating space is changed by the pump, and a difference between the pressure detection result of the first pressure sensor and the pressure detection result of the third pressure sensor in the state where the control valve is in the closed state and the pressure in the communicating space is changed by the pump.

2. An evaporated fuel processing device comprising:
a canister configured to communicate with a fuel tank though a tank passage, communicate with an intake passage of an engine through a purge passage, and communicate with open air through an open air passage;
a control valve disposed on the purge passage and configured to switch between a closed state and an open state, the closed state being a state of closing the purge passage, and the open state being a state of opening the purge passage;
a pump configured to change a pressure in a communicating space in a case where the control valve is in the closed state, the communicating space defined by the fuel tank, the tank passage, the canister, the open air passage, and the purge passage on a side closer to the canister relative to the control valve which communicate with one another;
an open air valve configured to switch between an open air communicating state and an open air non-communicating state, the open air communicating state being a state where the canister communicates with the open air through the open air passage, and the open air non-communicating state being a state where the canister does not communicate with the open air through the open air passage by closing the open air passage;
a pressure detector comprising a first detector configured to detect a pressure in the purge passage on a side closer to the control valve relative to the pump, a second detector configured to detect a pressure in the communicating space between the open air valve and the pump, and a third detector disposed for detecting a pressure in the fuel tank; and
a determining unit configured to determine that the evaporated fuel processing device is not operating normally by using a pressure detection result by the pressure detector in a state where the control valve is in the closed state and the pressure in the communicating space is changed by the pump, wherein
the pump is disposed on the purge passage between the control valve and the canister, and
the determining unit is configured to determine that the first detector, the second detector and the third detector are not operating normally respectively by using pressure detection results by the first detector, the second detector and the third detector in the state where the pressure in the communicating space is changed by the pump and the control valve is in the closed state after the pump has stopped and the control valve has switched to the closed state from the open state as a result of the pump having been driven while the open air valve is in the open air non-communicating state and the control valve is in the open state.

3. The evaporated fuel processing device as in claim 1 or 2, wherein
the pump is configured to supply evaporated fuel in the canister to the intake passage while the engine is driven and the control valve is in the open state.

* * * * *